(12) United States Patent
Aziz et al.

(10) Patent No.: US 7,062,537 B2
(45) Date of Patent: Jun. 13, 2006

(54) WORKFLOW SERVICES ARCHITECTURE

(75) Inventors: Imran Aziz, Seattle, WA (US);
Kong-Kat Wong, Sammamish, WA (US); Hugh A. Teegan, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 10/742,696

(22) Filed: Dec. 19, 2003

(65) Prior Publication Data
US 2004/0148214 A1 Jul. 29, 2004

Related U.S. Application Data

(63) Continuation-in-part of application No. 10/304,589, filed on Nov. 25, 2002.

(51) Int. Cl.
*G06F 15/16* (2006.01)

(52) U.S. Cl. ...................................................... 709/206
(58) Field of Classification Search .................... 705/8; 709/104, 206; 707/104.1; 717/120–123; 718/106
See application file for complete search history.

(56) References Cited

U.S. PATENT DOCUMENTS

| | | | | |
|---|---|---|---|---|
| 5,216,592 A | * | 6/1993 | Mann et al. ..................... 705/8 |
| 5,819,086 A | * | 10/1998 | Kroenke ....................... 707/102 |
| 5,999,911 A | * | 12/1999 | Berg et al. ...................... 705/8 |
| 6,393,456 B1 | | 5/2002 | Ambler et al. |
| 6,594,636 B1 | * | 7/2003 | Sakaguchi et al. .............. 705/8 |
| 6,678,714 B1 | * | 1/2004 | Olapurath et al. .............. 705/8 |
| 6,748,555 B1 | * | 6/2004 | Teegan et al. ................. 714/38 |
| 6,772,407 B1 | * | 8/2004 | Leymann et al. ............... 705/8 |
| 6,832,202 B1 | * | 12/2004 | Schuyler et al. ................ 705/8 |
| 2004/0088360 A1 | * | 5/2004 | Caughey ..................... 709/206 |
| 2005/0210114 A1 | * | 9/2005 | Washburn ................... 709/206 |

FOREIGN PATENT DOCUMENTS

| JP | 403170257 A | * | 7/1991 |
|---|---|---|---|
| JP | 404080466 A | * | 3/1992 |

OTHER PUBLICATIONS

Box, Inside SOAP, Feb. 9, 2000, xml.com, [online], [accessed Apr. 15, 2005 via http://www.xml.com/pub/a/2000/02/09/feature/index.html].*

Wong, Sun changes tune in support of SOAP protocol, Jun. 7, 2000, news.com, [online], [accessed Apr. 15, 2005 via http://news.com.com/Sun+changes+tune+in+support+of+SOAP+protocol/2100-1001_3-241568.html].*

(Continued)

*Primary Examiner*—Tamara L. Graysay
(74) *Attorney, Agent, or Firm*—Microsoft Corporation

(57) ABSTRACT

An automated workflow services system can accommodate a wide variety of workflow scenarios. A composition service, a constraint service, and a tracking service can be provided to client programs. The composition service can support client-directed instantiation of actions for activity flows. Activity flows can be based on an activity model, constructed on an ad hoc basis, or a combination thereof. Actions can be added to an activity flow at execution time of the activity flow. The tracking service can track messages to and from the actions.

1 Claim, 42 Drawing Sheets

OTHER PUBLICATIONS

"BEA WebLogic Integration™, Tutorial: Building Your First Business Process," Release 8.1, 148 pages, BEA Systems, Inc., Jul. 21, 2003.

"BEA WebLogic Platform™, Tour Guide," Release 8.1, 108 pages, BEA Systems, Inc., Jul. 21, 2003.

Singhal, "Developing End-to-End Business-to-Business Applications with BizTalk™ Server 2000," 73 pages, May 20, 2001.

Chang et al., "Extended Activity Diagrams for Adaptive Workflow Modeling," *IEEE*, Fourth International Symposium on Object-Oriented Real-Time Distributed Computing, Magdeburg, Germany, pp. 413-419, 2001.

Classen et al., "Towards Evolutionary and Adaptive Workflow Systems—Infrastructure Support Based on Higher-Order Object Nets and CORBA," *IEEE*, 1st International Enterprise Distributed Object Computing Conference (EDOC '97), Gold Coast, Australia, pp. 300-308, 1997.

Janssens et al., "Techniques for Modelling Workflows and Their Support of Reuse," *Lecture Notes in Computer Science, vol. 1806: Business Process Managements—Models, Techniques and Empirical Studies*, pp. 1-15, Springer-Verlag, 2000.

Jarvis et al., "A Framework of Equipping Workflow Systems with Knowledge about Organisational Structure and Authority," Artificial Intelligence Applications Institute, Division of Informatics, The University of Edinburgh; Department of Chemical Engineering, Loughborough University, 15 pages, 1999.

Narendra, "Goal-Based and Risk-Based Creation of Adaptive Workflow Processes," Software Engineering Process Group, Hewlett-Packard India Software Operations Ltd., pp. 103-110, 2000.

Reichart et al., "Supporting Adaptive Workflow in Advanced Application Environments," Department of Databases and Information Systems, University of Ulm, 10 pages, 1998.

Reichart et al., "$ADEPT_{flex}$—Supporting Dynamic Changes of Workflow Without Losing Control," *Journal of Intelligent Information Systems 10*, pp. 93-129, 1998.

van der Aalst, "How to Handle Dynamic Change and Capture Management Information?: An Approach Based on Generic Workflow Models," *International Journal of Computer Systems Science & Engineering*, vol. 16, No. 5, pp. 295-318, Sep. 2001.

van der Aalst, "Generic Workflow Models: How to Handle Dynamic Changes and Capture Management Information?" AIFB (University of Karlsruhe, Germany) and LSDIS (University of Georgia, USA), 12 pages, 1999.

Yanbo et al., "Exception Handling and Adaptive Changes in Workflow Management," The Fifth International Conference for Young Computer Scientists, *Advances in Computer Science and Technology*, vol. I, pp. 264-268, 1999.

* cited by examiner

WORKFLOW SERVICES ARCHITECTURE

CROSS REFERENCE TO RELATED APPLICATIONS

This application is a continuation-in-part of U.S. patent application Ser. No. 10/304,589 to Teegan et al, "SYSTEM AND METHOD FOR COMPOSING AND CONSTRAINING AUTOMATED WORKFLOW" filed Nov. 25, 2002, which is hereby incorporated herein by reference.

TECHNICAL FIELD

The technical field relates generally to automated workflow technologies.

BACKGROUND

Automated workflow technologies have been touted as a panacea for enhancing productivity in the workplace. By bringing the science of computer automation to business processes, workflow technologies promise to apply the power of software to the way companies do business.

Automated workflow technologies can represent a business process in software as a workflow. Workflow designers typically break the business process into discrete pieces that are to be performed and monitored until some completion criteria are achieved.

A persistent problem with workflow technologies is that they are typically incomprehensible to the average business worker. For example, constructing a workflow typically requires programming skills and extensive knowledge of the workflow system. Even sophisticated information workers generally do not possess the requisite programming skills and are not able or willing to learn yet another information system for the sake of utilizing the workflow technologies.

In addition, information workers tend to lose interest in the workflow system because it does not reflect the way they actually conduct business. For example, a small exception in a process typically cannot be accommodated by the workflow system, so it can often inhibit accomplishing the business process rather than facilitating it.

Conventional approaches to automated workflow are typically too complicated and rigid for actual worker needs. Thus, there is still a need for improved techniques for automated workflow.

SUMMARY

Technologies described herein can be used in a wide variety of automated workflow scenarios. For example, a workflow service can provide for execution of composable actions. The actions can send and receive a standard set of messages, the format of which can be specified by standard interfaces.

The workflow service can include a composition service, a constraint service, and a tracking service. The composition service can support composition of actions on an a priori basis, an ad hoc basis, or a combination of the two. A priori composition can be based on an activity model.

The constraint service can support a wide variety of constraints, including constraints based on the identity of an actor. Constraints can constrain actions or target actors. Constraints can be relative or negative. In addition, constraints for transitive actions can be supported.

The services can communicate via a Single Object Access Protocol (SOAP)-based protocol with the clients, and the services can be client agnostic. User interfaces for accessing the services can be integrated into commonly-used applications already appearing on the desktops of users. For example, workflow operations can be easily integrated into familiar email or word processing interfaces.

Messages to and from actions can be tracked. As a result, the status of workflow processing can be provided.

A resilient workflow service accommodating unanticipated situations can be implemented via the technologies described herein.

Composable actions providing a wide variety of action functionality and action cooperation can be implemented via the technologies described herein.

The foregoing and other features and advantages will become more apparent from the following detailed description of disclosed embodiments, which proceeds with reference to the accompanying drawings.

DETAILED DESCRIPTION OF EXEMPLARY EMBODIMENTS

EXAMPLE 1

Exemplary Workflow System

Figure 1:
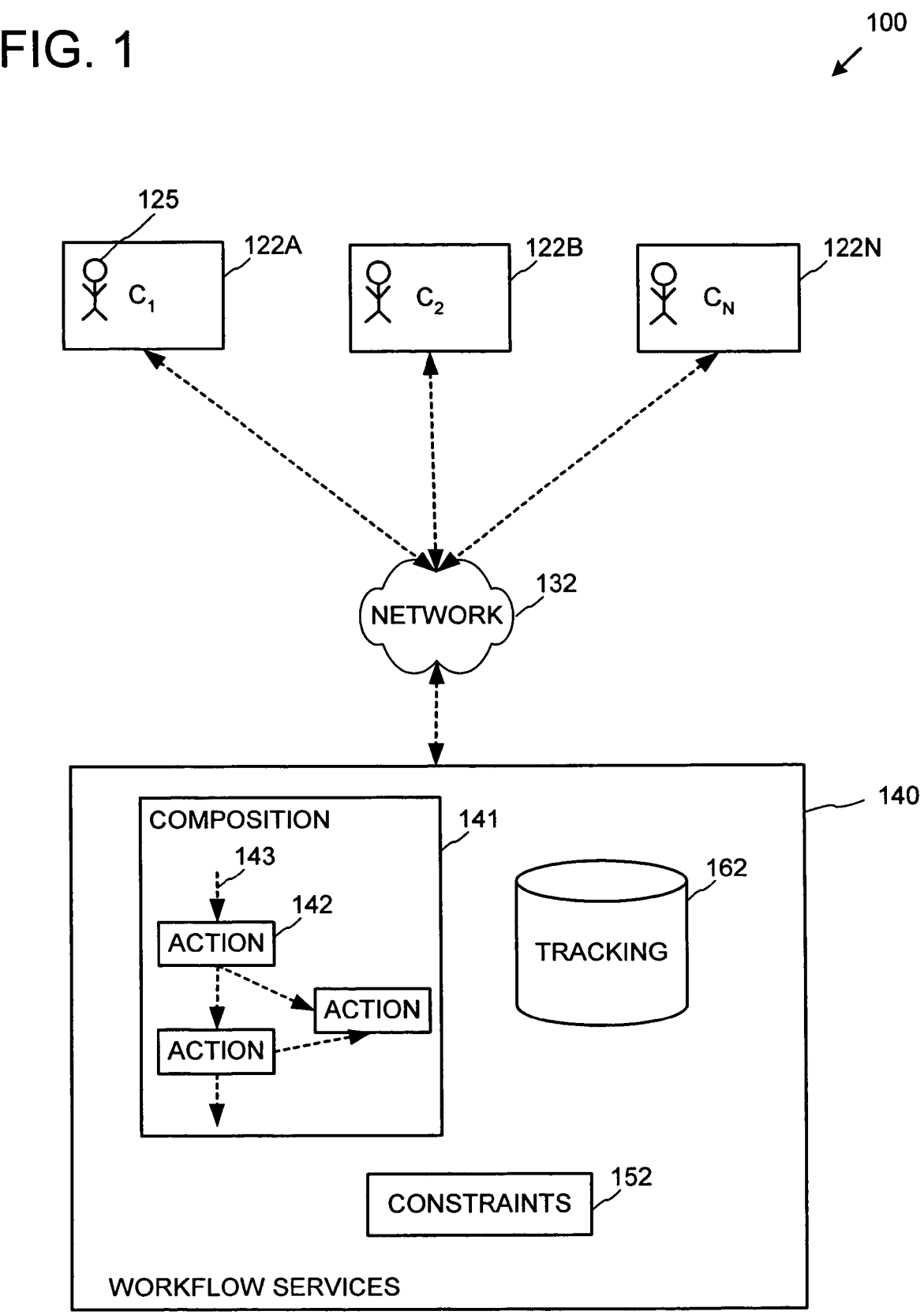
FIG. 1 is a block diagram showing an exemplary system supporting automated workflow.

FIG. 1 shows an exemplary system 100 for implementing automated workflow via composable actions. In the example, a plurality of client programs 122A–122N access workflow services 140 via a network 132 (e.g., over a network connection). In practice, the client programs 122A–122N are operated by respective human actors. The human actors are human participants in the workflow processing performed in the workflow services 140 and can be represented in the system by identity information (e.g., the information 125).

The workflow services 140 can operate independently of the user interfaces and other details of the client programs 122A–122N. Thus, the client programs 122A–122N can take a variety of forms or be uniform as desired. Because the services 140 can be accessed by a variety of clients (e.g., different types of client software), they are sometimes called "client agnostic."

The workflow services 140 can perform workflow processing via a composition service 141, which can assemble composable actions (e.g., the action 142) into activity flows. The composable actions can send and receive messages (e.g., the message 143) according to standard interfaces.

Indications of the messages can be stored by a tracking service (e.g., in a tracking database 162) for later retrieval, such as tracking the status of activity flows. A constraint service 152 can implement constraints to impose a wide variety of constraints to guide users during workflow processing. The constraint service can consult a fact store to apply constraints as appropriate. Such a fact store can contain a wide variety of information for an organization, and new fact types can be accommodated.

In practice, the system 100 can have any number of client programs, execute over a plurality of networks, and support a wide variety of concurrently-executing actions and activity flows.

EXAMPLE 2

Exemplary Method for Processing Workflows

Figure 2:
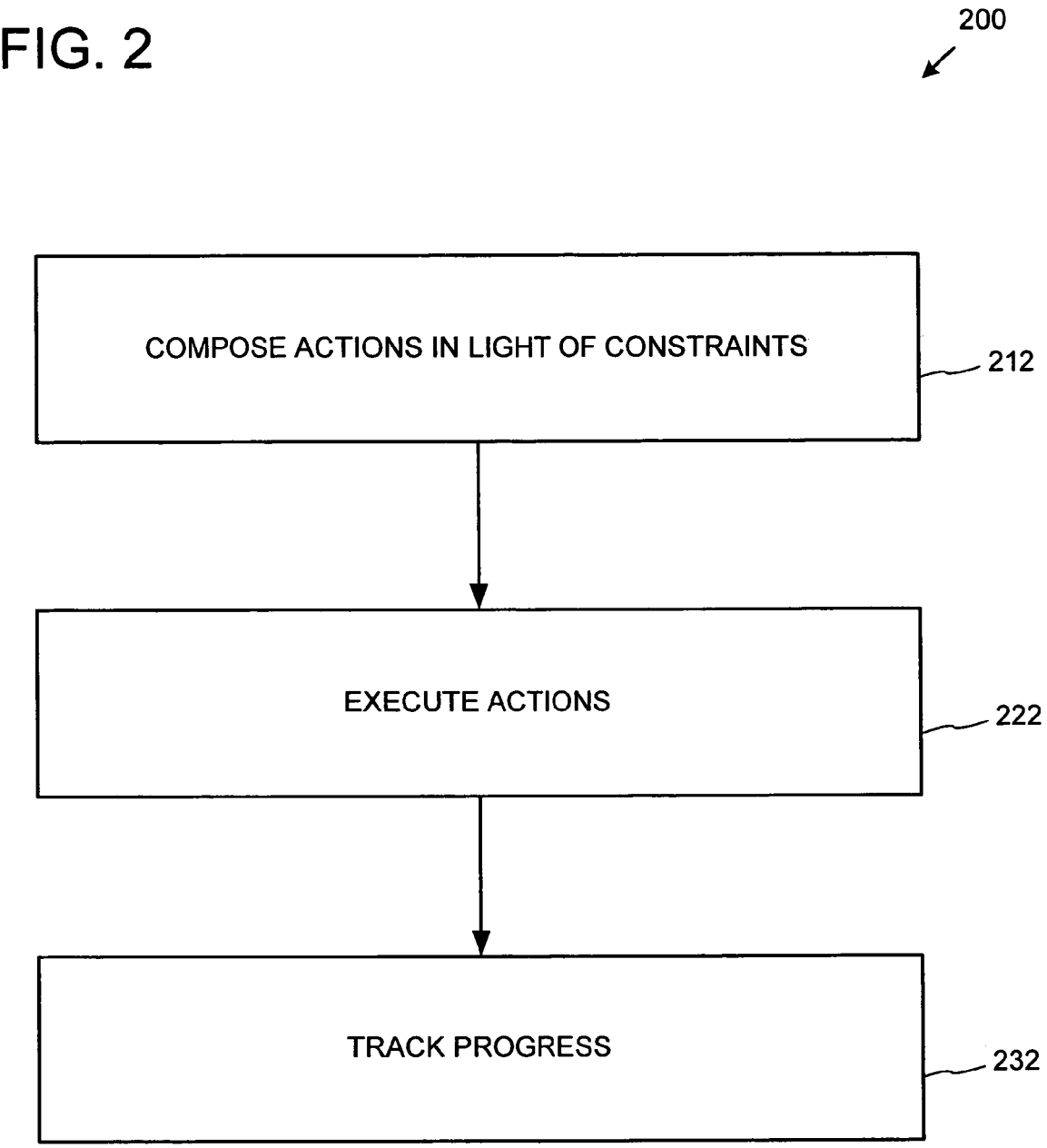
FIG. 2 is a flowchart of an exemplary method for processing workflow in an automated system, such as that of FIG. 1.

FIG. 2 shows an exemplary method 200 for processing workflow in an automated workflow system, such as that of FIG. 1. The method 200 can be performed by software.

At 212, composable actions are composed into activity flows in light of constraints. For example, a constraint service can indicate possible actions and target actors based on a fact store. At 222, the actions are executed by the workflow services. Execution can take a wide variety of forms and include a wide variety of processing, including receiving information or indications from human actors. During execution, tasks can be assigned and information regarding the tasks collected.

At 232, the progress of the activity flows is tracked. For example, messages sent to and from composable actions can be recorded for later inspection. Information regarding tasks associated with the activity flows can also be tracked.

In practice, a workflow system can offer a wide variety of other functionality, including the ability to build activity models which specify a set of actions for execution in the workflow services.

EXAMPLE 3

Exemplary Actions

Figure 3:
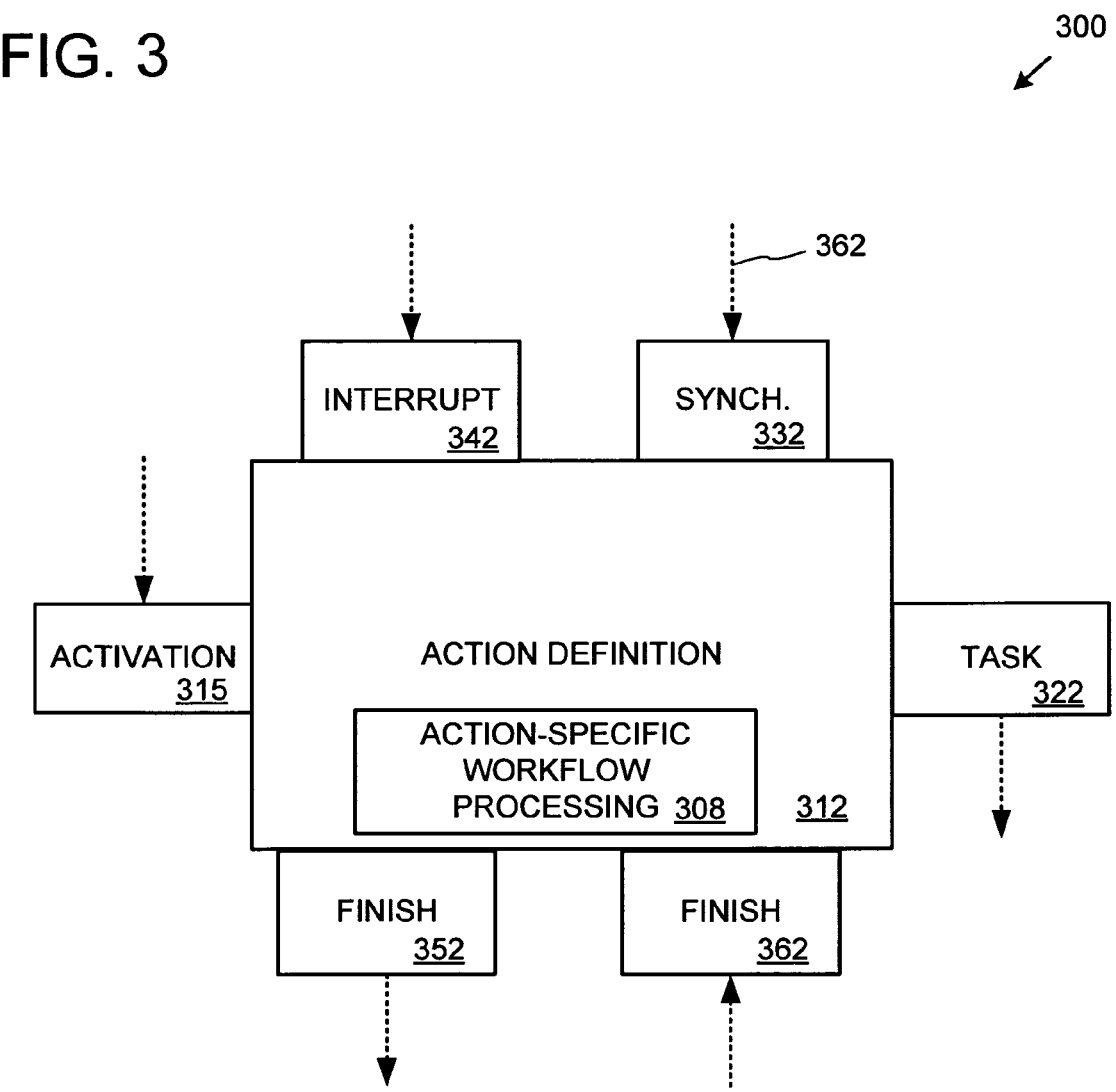
FIG. 3 is a block diagram showing an exemplary pattern for a composable action.

In any of the examples described herein, a composable action can take the form of the exemplary composable action 300 shown in FIG. 3. The action 300 can be instantiated from a composable action definition, which typically includes a definition of the action's action-specific workflow processing (e.g., business logic) 308.

The interfaces 312, 322, 332, 342, 352, 362 can take the form of standard interfaces. For example, the interfaces 312, 322, 332, 342, 352, 362 can accept messages conforming to an Extensible Markup Language (XML) schema (e.g., an XML Schema Definition (XSD) specification) used throughout the workflow system. In this way, a developer can develop new actions; if the actions conform to the XML schema, they can be composed with other actions in the workflow services and benefit from the workflow services features. A different schema can be used for each of the interfaces 312, 322, 332, 342, 352, 362. For example, the schema related to the task interface 322 can include how to specify the actor associated with a task.

Messages (e.g., the message 362) can be received by logic encapsulated by the action for a variety of reasons, including to activate the action, interrupt the action, finish the action, or synchronize (e.g., unblock) the action with other composable actions. Similarly, messages can be sent by logic encapsulated by the action for a variety of reasons, including indicating that the action has been activated, that the action has finished, or that a task is to be assigned (e.g., to an actor).

Alternative arrangements of interfaces are possible, such as fewer, more, or different interfaces. However, certain identical interfaces can be used throughout (e.g., interfaces for receiving activation and interrupt messages) if conformity is desired. Because the interfaces facilitate connection of the composable actions to each other, the workflow services, and client systems, they are sometimes called "pins." Action definitions having the pins can be installed into the workflow services for use by workflow participants. Constraints regarding the accessibility of the installed actions can be specified by an administrator. The workflow system can then present the action as an option only to the appropriate actors.

EXAMPLE 4

Exemplary Method of Processing Messages Via Interfaces

Figure 4:
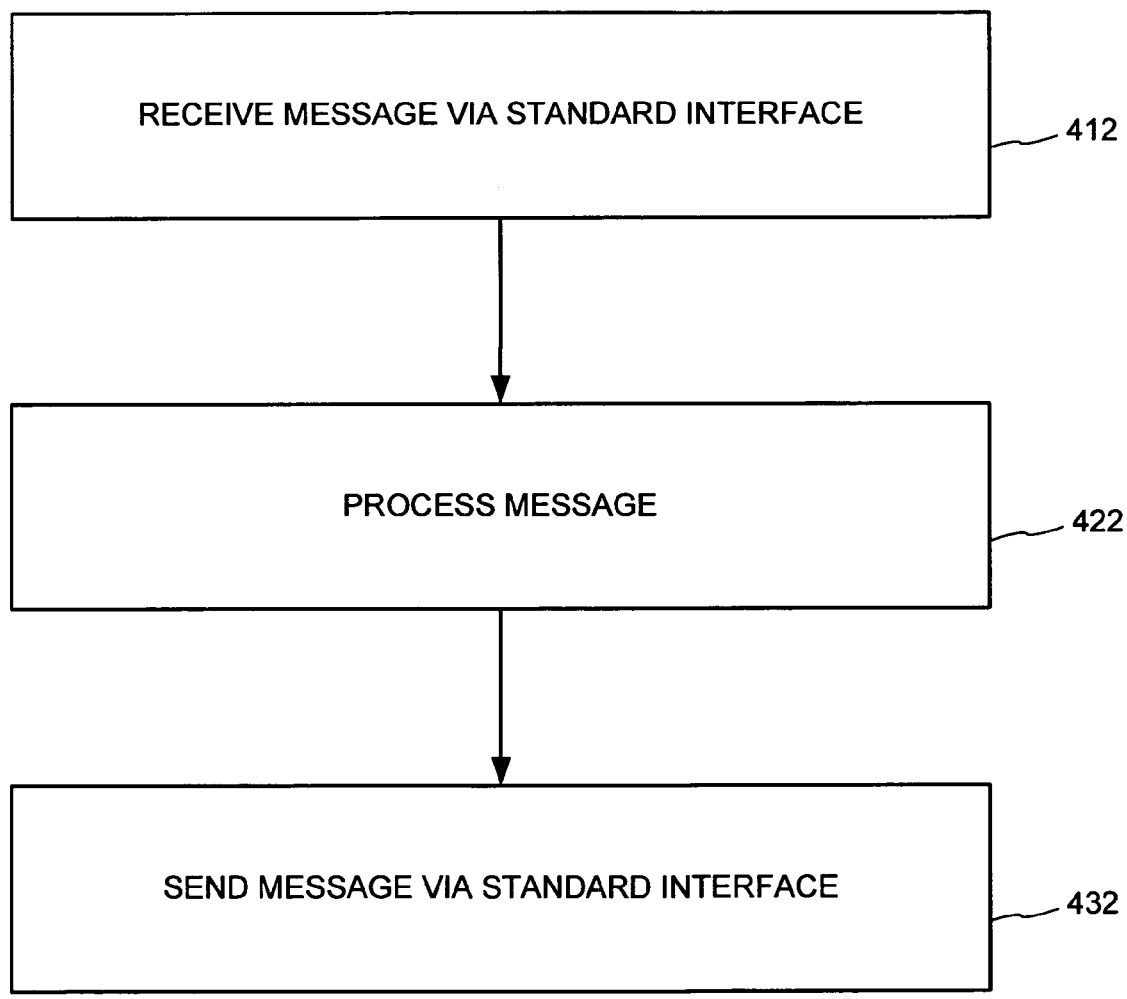
FIG. 4 is a flowchart of an exemplary method of processing messages in a composable action.

FIG. 4 shows an exemplary method of processing messages in a composable action, such as by the composable action 300 of FIG. 3. At 412, a message is received by one of the standard interfaces by the action via logic encapsulated by the action. At 422, the message is processed. At 432 a message is sent from one of the standard interfaces by the action via logic encapsulated by the action.

In practice, sending and receiving of messages can be much more complicated, including synchronization between messages, and a variety of processing by the action. However, a template can be provided to developers by which the desired business logic of the action can be easily integrated into the template to facilitate creation of actions by developers without becoming familiar with the detailed workings of the workflow services.

EXAMPLE 5

Exemplary Activity Flows

An executable set of one or more composable actions can take the form of an activity flow. The workflow services can coordinate the activation, instantiation, and execution flow between the actions. During execution, the actions can send and receive messages to and from the workflow services and each other. Additionally, the actions can send and receive messages from client programs (e.g., via the workflow services).

EXAMPLE 6

Exemplary Messages

A wide variety of messages can be supported by the workflow services. However, by choosing a set of possible messages, standard modes of communication between actions, the workflow services, and clients of the workflow services can be achieved. Table 1 shows an exemplary set of messages for a workflow system.

TABLE 1

Exemplary Message Types

| Message Type Name | Description |
| --- | --- |
| Activate | Sent to action to activate it. |
| Activate Response | Sent by action to indicate it was instantiated and activated. The message can be looped back to the action itself to initialize values used to correlate other messages received by the action. |
| Synchronize | Can be sent or received by an action. Used for action-to-action communication. Can enable dependent composition between actions. For example, can be used to unblock processing within an action when received. |
| Task | Sent by action to an actor and can signify the assignment of a task to the actor. |
| Response | Sent by actor (e.g., via client software) to the action and can signify the response to a Task message (e.g., that the task was accepted and the results). |
| Finish | Sent by an action at the end of its execution. Can also be received to indicate that an action is to finish (e.g., for termination of dependent actions in a synchronization scenario). |
| Interrupt | Sent to action (e.g., via an actor) to interrupt execution. The action can implement roll back functionality in response. |

Each of the protocol messages can conform to an XSD schema. Thus, messages can be sent in XML.

EXAMPLE 7

Exemplary Synchronization Scenario

In some situations, it may be desirable for actions to synchronize execution with each other. For example, a first action may execute while a second action waits for the first to indicate that it is proper for the second action to proceed. Such an approach can be used to implement timeouts in activity flows.

Figure 5:
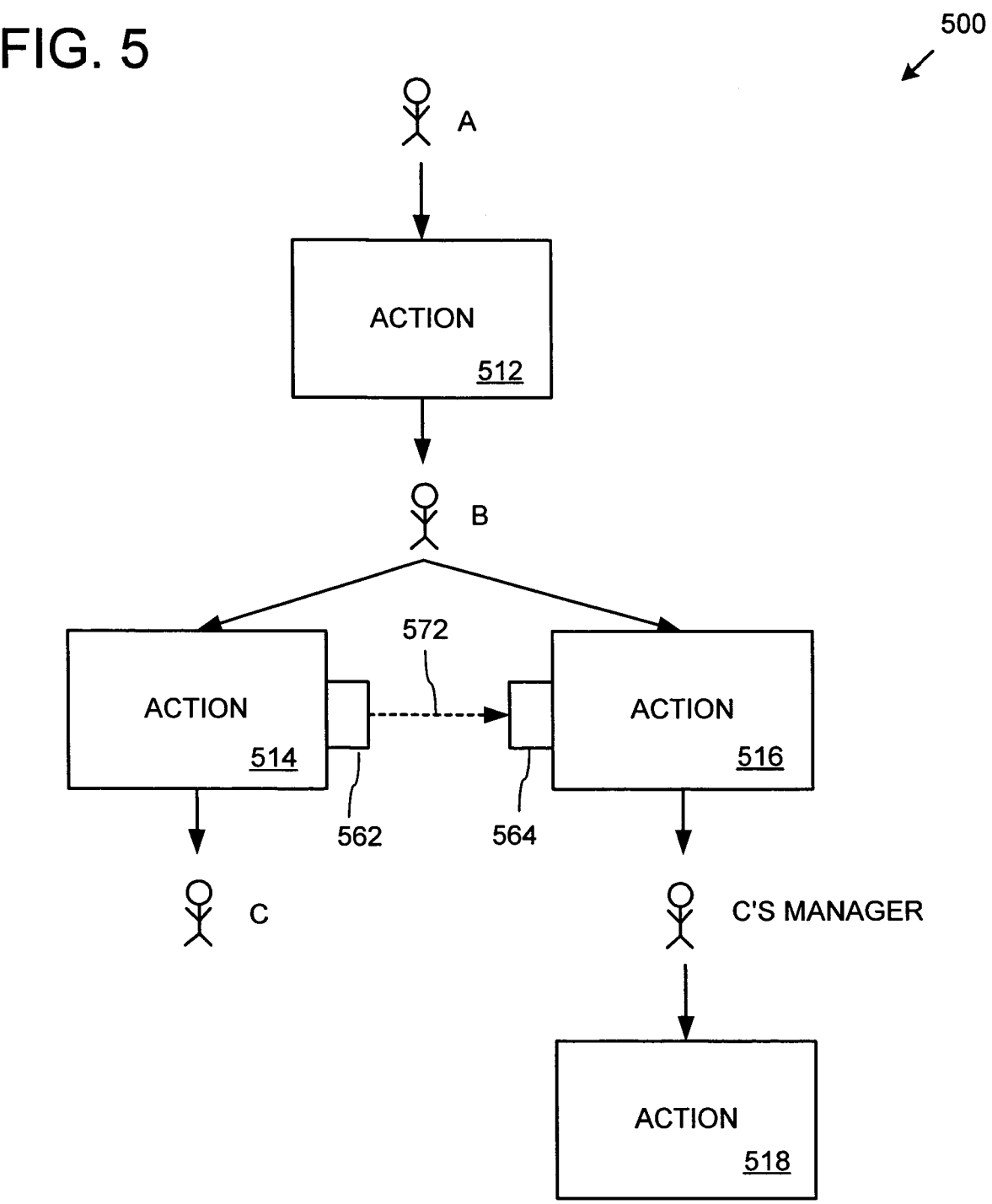
FIG. 5 is a block diagram showing exemplary action-to-action communication via messages.

FIG. 5 shows exemplary action-to-action communication via messages. Such an arrangement 500 can be used for dependent action composability and synchronization functionality.

In the example, due to activity of actor A, execution of the activity flow has reached the action 512, which assigns a task to actor B. Actor B then activates actions 514 and 516, making the action 516 dependent on the action 514. For example, the action 514 can be a "delegation" action, and the action 516 can be an "escalation action." Actor B can choose actor C as the target for delegation, and also specify that if C does not respond within a certain time limit, an escalation is to be sent to C's manager. The action 516 can in such a case block until the action 514 times out and sends a synchronization message 572.

The synchronization message 572 is sent between the interfaces 562 and 564. Upon receipt of the synchronization message 572, the action 516 becomes unblocked and performs its functionality, sending a message to C's manager. C's manager can then extend the flow to the next action 518.

Figure 6:
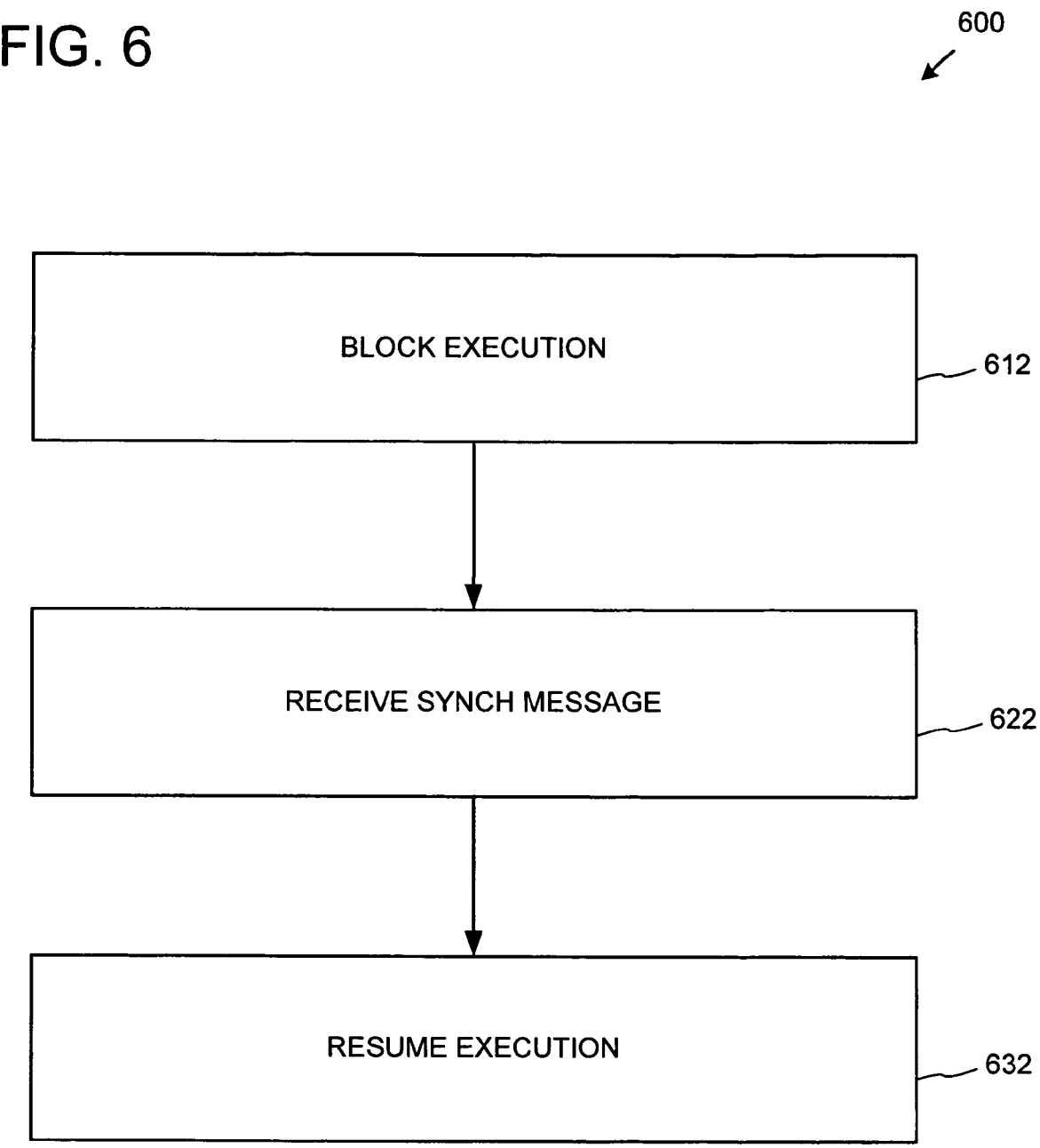
FIG. 6 is a flowchart of an exemplary method for accomplishing synchronization via action-to-action communication.

FIG. 6 shows an exemplary method 600 for accomplishing synchronization via action-to-action communication. At 612, execution of an action is blocked. At 622 the blocked action received a synchronization message. At 632, the blocked action resumes execution.

The arrangement 500 or 600 can be useful for coordinating execution along parallel execution paths, and can be employed to implement timeout conditions, such as when an actor is assigned a task, but the task is escalated to someone else if the actor does not respond within a timeout period. Synchronization messages can be used in any of a wide variety of other action-to-action communication scenarios (e.g., to monitor the progress of another action).

EXAMPLE 8

Exemplary Tasks

In workflow processing, it is often desirable to assign work for human participants. Such assignments can be accomplished by assigning tasks to actors. Task functionality can be implemented generically by the workflow services to support a wide variety of implementations by workflow services clients. The details concerning tasks can be handled by client software. For example, the workflow services can track that there is a task assigned to a particular actor, but how the task is accomplished need not be understood or implemented by the workflow services.

For example, the client software can present the task to a human actor, who responds and may take additional steps to complete the task. In many instances, human-to-human interaction is involved in accomplishing the task, so implementing the tasks generically within the workflow services enables the workflow services to be useful in a more wide variety of circumstances.

Figure 7:
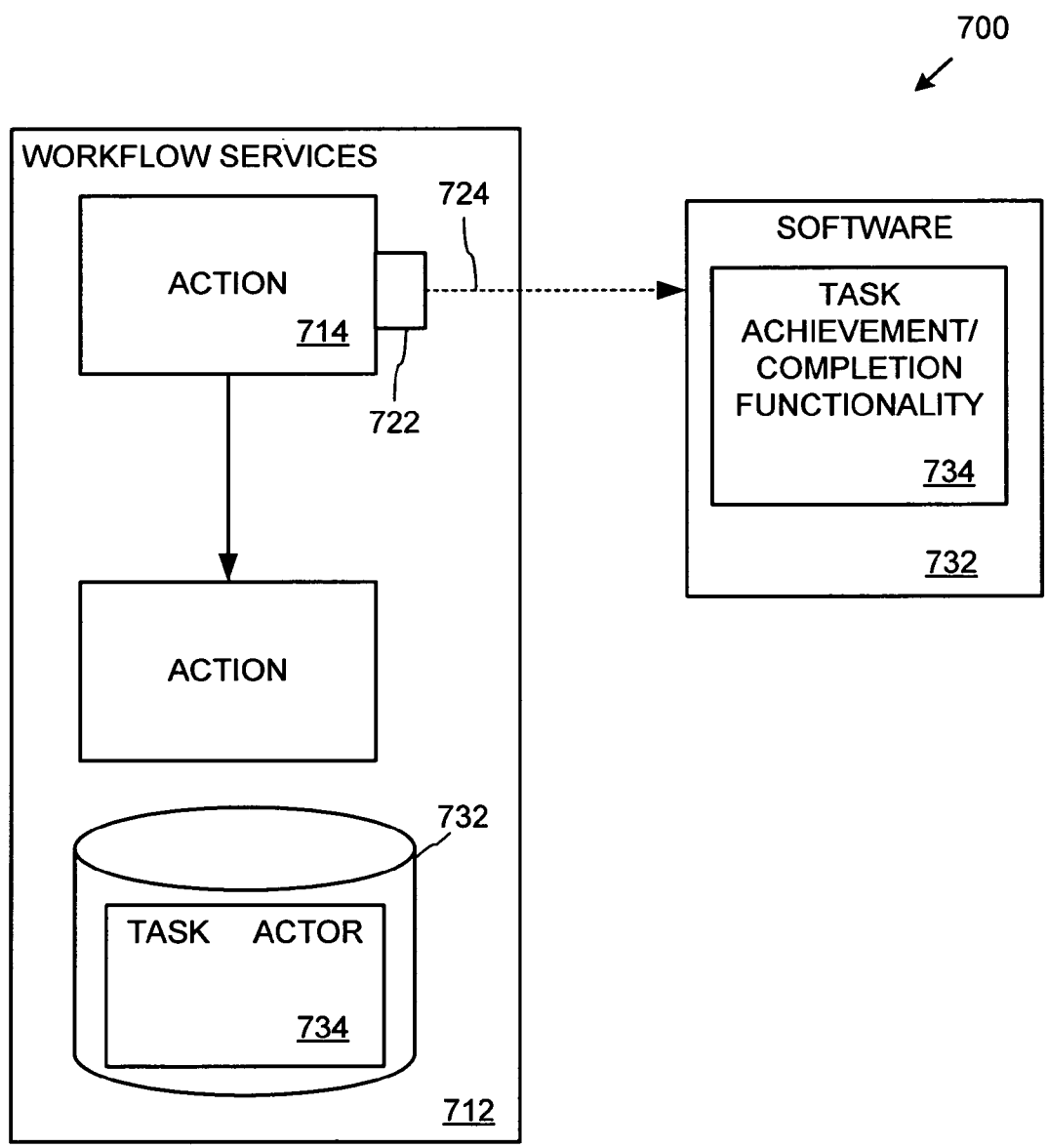
FIG. 7 is a block diagram showing exemplary implementation of tasks.

FIG. 7 shows an exemplary arrangement 700 by which workflow services 712 can support tasks. In the example, an action 714 can send a task message 724 via a standard interface 722. The task message 724 is directed to client software 732, which includes task achievement functionality, task completion functionality, or both 734.

The workflow services 712 can intercept the message 724 for tracking purposes and store an indication of the message 724 in a database 732. For example, a table 734 can indicate the task assigned and the associated actor. In practice, additional information can be stored (e.g., when the task was assigned, task results, and the like). The information can be taken from or represented by messages sent to and from the actions 714.

Figure 8:
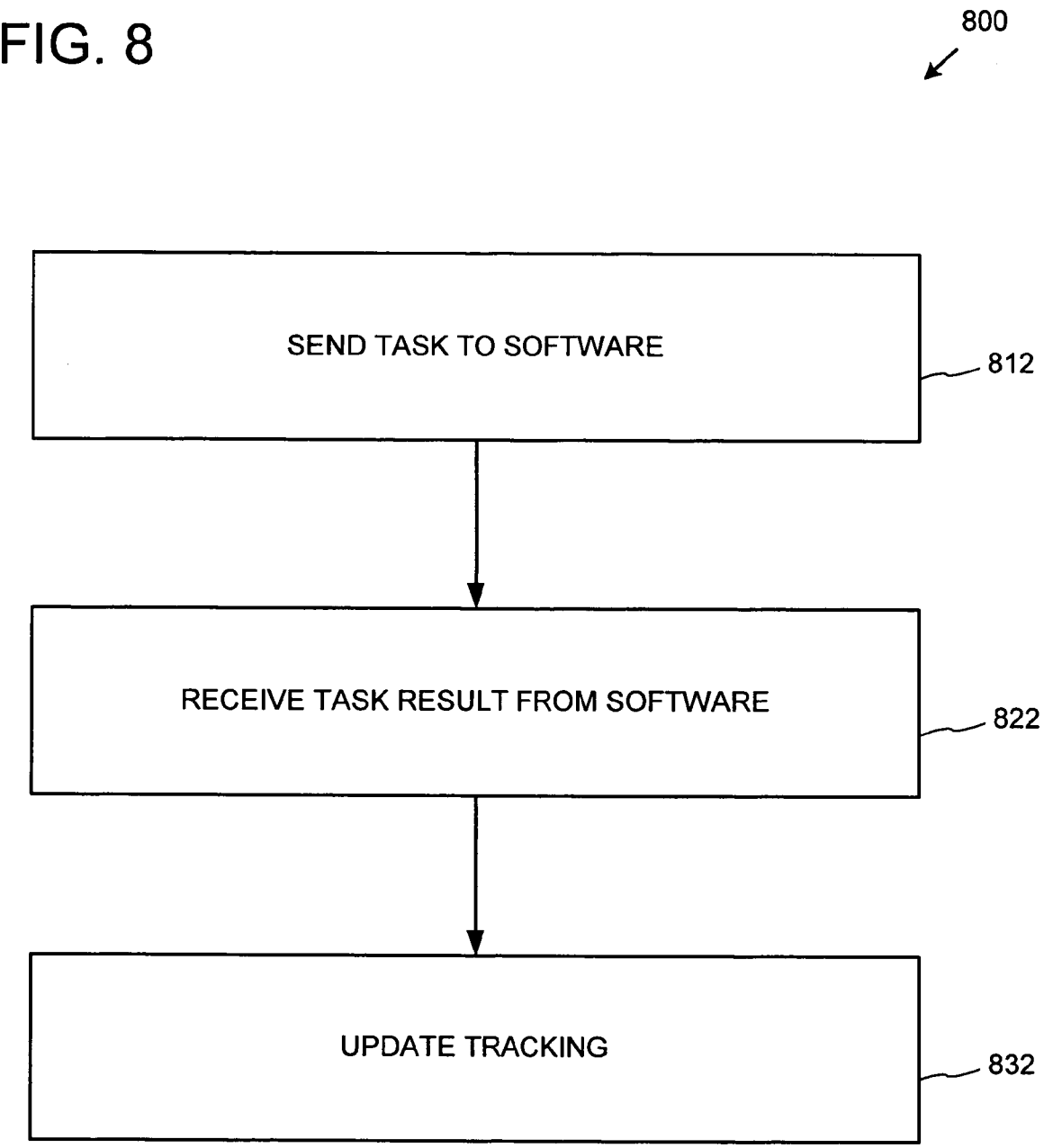
FIG. 8 is a flowchart of an exemplary method for processing tasks.

FIG. 8 shows an exemplary method 800 for processing tasks. At 812, a task message is sent to the task-supporting software. At 822, a result of the task is received by the workflow services from the task-supporting software.

At 832, the tracking system of the workflow services is updated. In this way, queries about workflow progress (e.g., progress of tasks) can be answered and presented to users who wish to monitor workflow progress.

EXAMPLE 9

Exemplary Composability of Actions

In any of the examples described herein, the actions can be composed (e.g., pieced together) to form an activity flow. Due to the design of the workflow services, actions can be composed at execution time (e.g., runtime) of the activity flow. As the workflow processing related to an activity flow is proceeding, additional actions can be added to the activity flow. Thus, the system can support activity flows created in an a priori manner (e.g., during design time of the activity model), in an ad hoc manner (e.g., during execution time of the activity model), or some combination thereof (e.g., adding actions on an ad hoc basis to an activity flow created in an a priori manner).

A developer can design new actions, which can be installed into system as long as they fit the pattern supported by the workflow services.

EXAMPLE 10

Exemplary Constraints

In any of the examples described herein, the workflow services can accommodate constraints via a constraints service. Constraints can be defined generically to support a wide variety of forms. For example, a constraint can evaluate various aspects of a current scenario and compare it to a store indicating which actions or targets are available for the current scenario. The available actions or targets can be provided to client software, which can present them for consideration by participant actors during execution or construction of an activity flow.

In addition to being applied before any action is executed, constraints can also be applied at execution time of associated activity flows. Although constraints can be used to limit what actors can do next, they can also have the corollary effect of guiding actors on what actions are available during execution of the workflow. In this way, the system can avoid overwhelming a user with numerous meaningless options, and a simple but effective user interface can be presented.

An exemplary constraint restricts which actors can perform which actions or initiate an activity flow based on a particular activity model. For example, access to a particular action or activity model can be restricted to a particular role, group, or actor. A constraint service can impose constraints generically with respect to facts.

Similarly, the actors that can be targeted (e.g., to which a task can be assigned) can be similarly restricted. For example, an actor might only be permitted to assign an accounting task to people in the accounting department, or the like.

A wide variety of facts can be included for consideration by the constraint service. For example, an organization may store information indicating an actor's name, the associated department, whether the actor is a manager, the direct reports of the actor, and the like. Such facts can be drawn from a variety of sources as described elsewhere herein. Constraints can be defined for any of the facts available via knowledge bases.

Additionally, the workflow services can support relative constraints. For example, a task might only be escalate-able to a manager of the escalating actor. Or, an actor might only be permitted to assign a task to target actors in her department. Thus, relationships between actors and targets can be taken into consideration.

Further, constraints can be defined in a negative way. For example, instead of specifying the actors who can start an activity flow, the actors who cannot start an activity flow can be specified.

Still further, the workflow services can support constraints for transitive actions. For example, in a scenario in which a task has been assigned to someone in the accounting department, a constraint can specify which actors are permitted to act upon (e.g., escalate) the task as well as constraining the transitive target (e.g., the new person to whom the task is assigned). The constraint can also take into account the actor enacted on (e.g., the target actor to which the task is already assigned). A constraint for a transitive action can be specified relatively (e.g., a relationship between a source actor and an enacted on actor)

Other constraints can be based on a document type. For example, if a task has a particular document type (e.g., a proposal), then constraints can control which actions and what targets are available. In an activity model, determining the next action to be executed can be implemented as a form of constraint.

Still other constraints can be based on activity flow progress state (e.g., where within the activity model the activity flow has progressed). For example, if an activity model is associated with a document, and the activity model has not yet been instantiated (e.g., the progress state is "not started"), constraints can affect the available actions. After the activity flow for the activity has started (e.g., the progress state is "started"), different constraints can present different actions. Similarly, when the activity flow has finished (e.g., the progress state is "finished"), constraints can so reflect (e.g., to not present finishing the activity flow as an option). Other states can be supported (e.g., finished a particular action, or the like).

Figure 9:
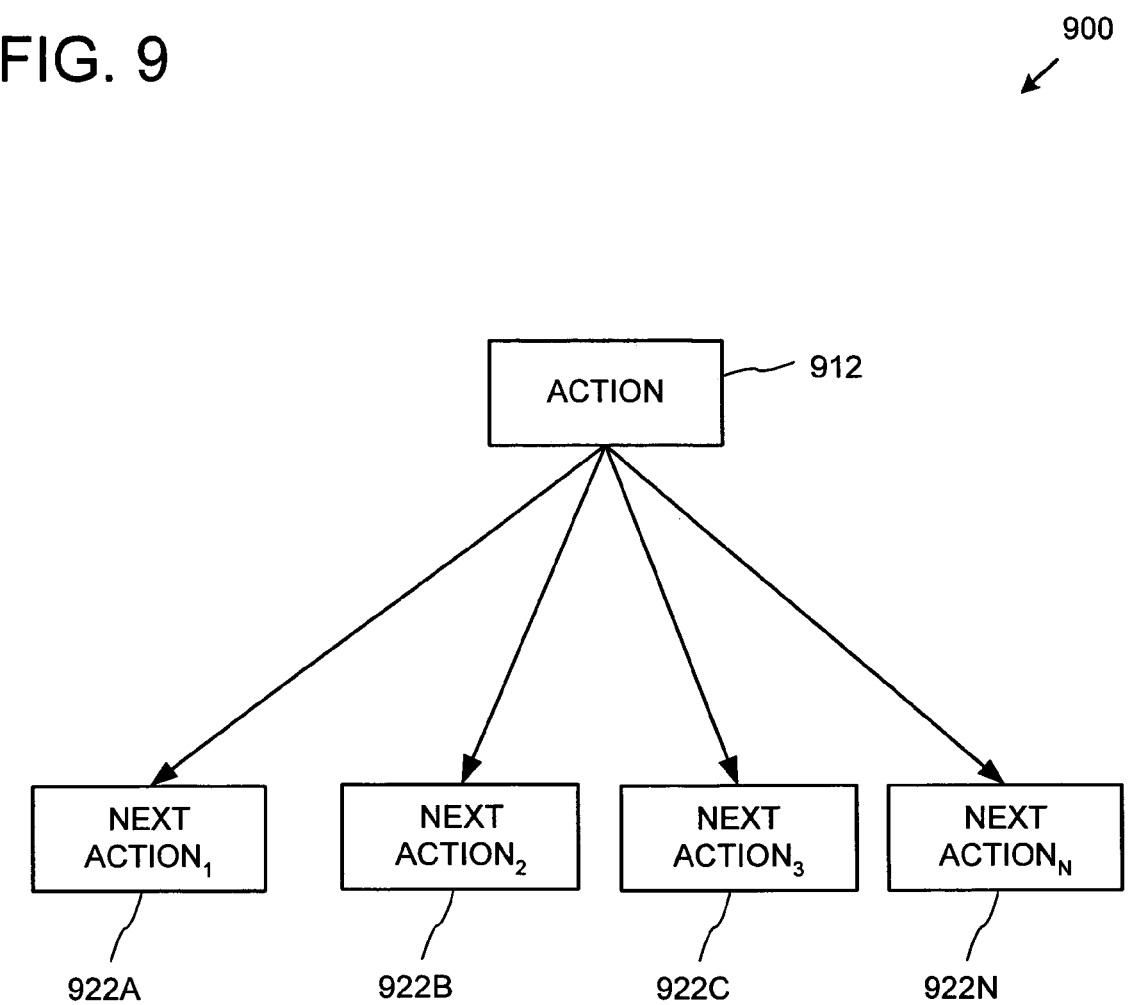
FIG. 9 is a block diagram showing an exemplary implementation of constraints.

FIG. 9 shows an exemplary arrangement 900 involving constraints for determining a next available action. In the example, the workflow services are determining possible next actions for an action 912. In the example, any of the actions 922A–922N are possible. Depending on the circumstances surrounding the scenario (e.g., the identity, group, or role of the actor choosing the next action, and the like), the set of next actions 922A–922N is constrained to the sub set of actions indicated by the constraints stored by the workflow services. Determining the next action can be performed by a constraint engine applying the constraints to a current situation.

Figure 10:
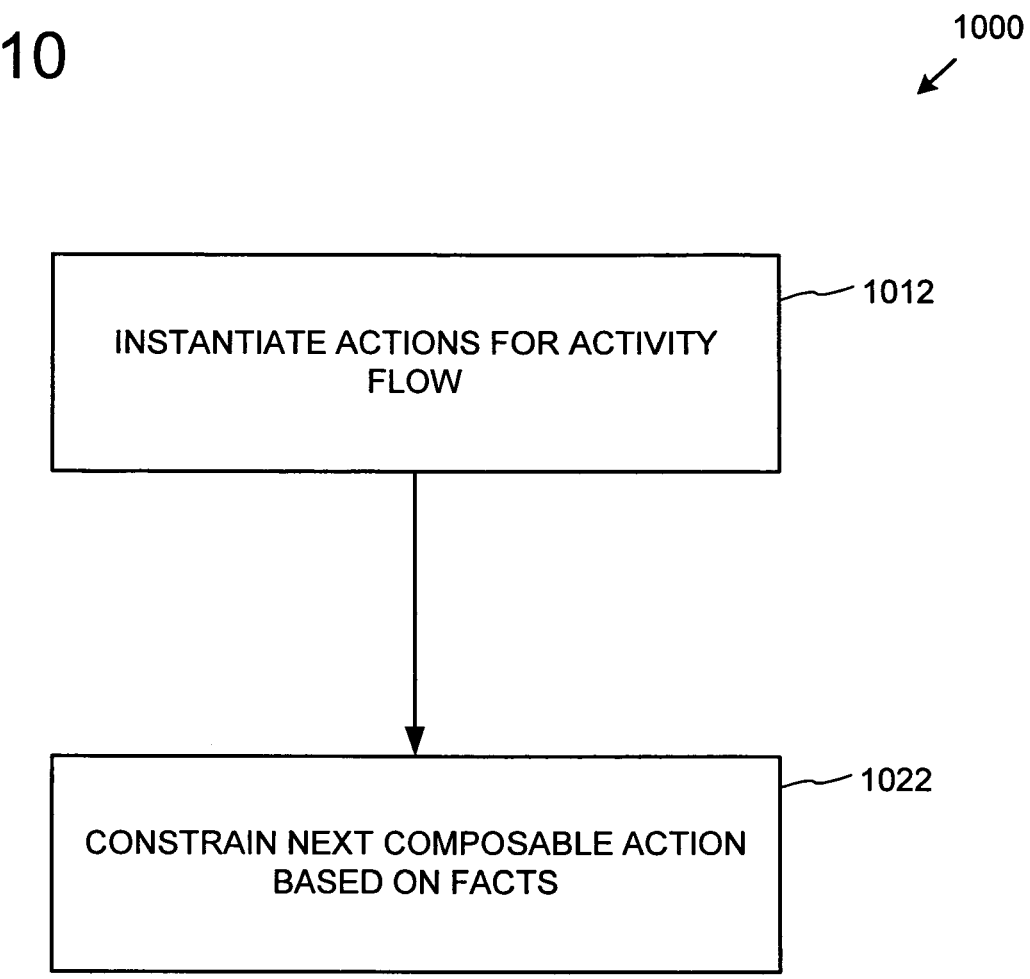
FIG. 10 is a flowchart of an exemplary method for implementing constraints for composable actions.

FIG. 10 shows an exemplary method 1000 for implementing constraints in an activity flow. At 1012, actions for an activity flow are instantiated. Execution can then begin. At execution time of the activity flow, at 1022, the actions available for composition as the next action are constrained based on facts.

Employing constraints in a generic way enables a wide variety of mechanisms by which a workflow participant is guided during workflow execution. Constraints are typically managed via an administrator, but participant actors can contribute to constraints (e.g., when putting together an activity flow).

EXAMPLE 11

Exemplary Acquisition of Facts for Constraints

Figure 11:
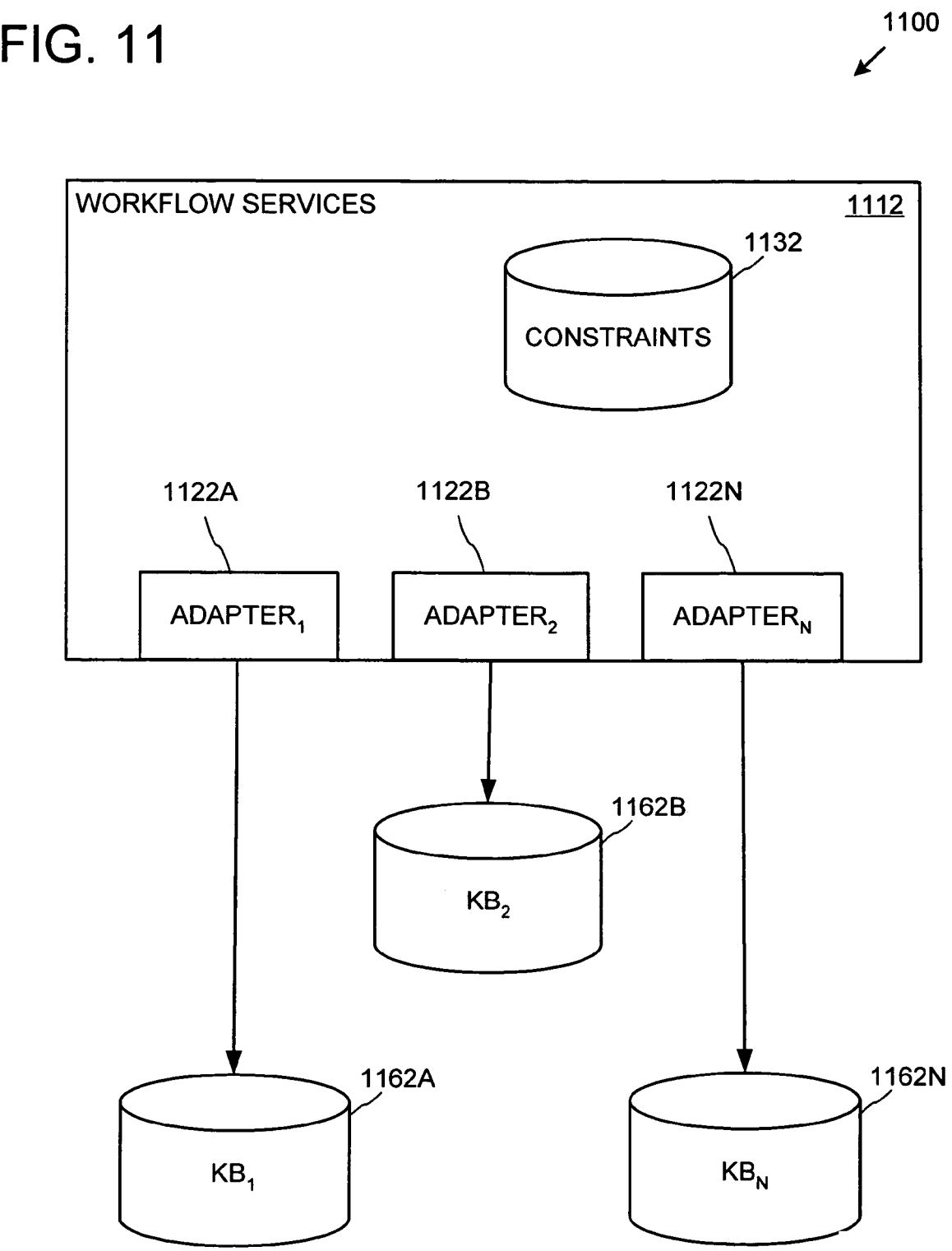
FIG. 11 is a block diagram showing fact collection via knowledge base adapters.

FIG. 11 shows an exemplary arrangement 1100 in which workflow services 1112 interact with one or more knowledge bases 1162A–1162N for the purpose of applying the constraints 1132. In the example, one or more respective adapters 11122A–1122N are used to interface with the knowledge bases 1162A–1162N to acquire facts.

Availability of the facts in a knowledge base (e.g., the knowledge base 1162A) can be accomplished by installing a respective knowledge base adapter (e.g., the adapter 1122A) in the workflow services. The adapter 1122A includes a mapping by which the information in the knowledge base 1162A can be retrieved for use by the workflow services 1112. For example, the workflow services 1112 may wish to consult facts concerning actors, their positions, a security level, and the like when applying the constraints 1132. In this way, the facts available to the workflow services 1112 can come from any of a wide variety of sources.

Figure 12:
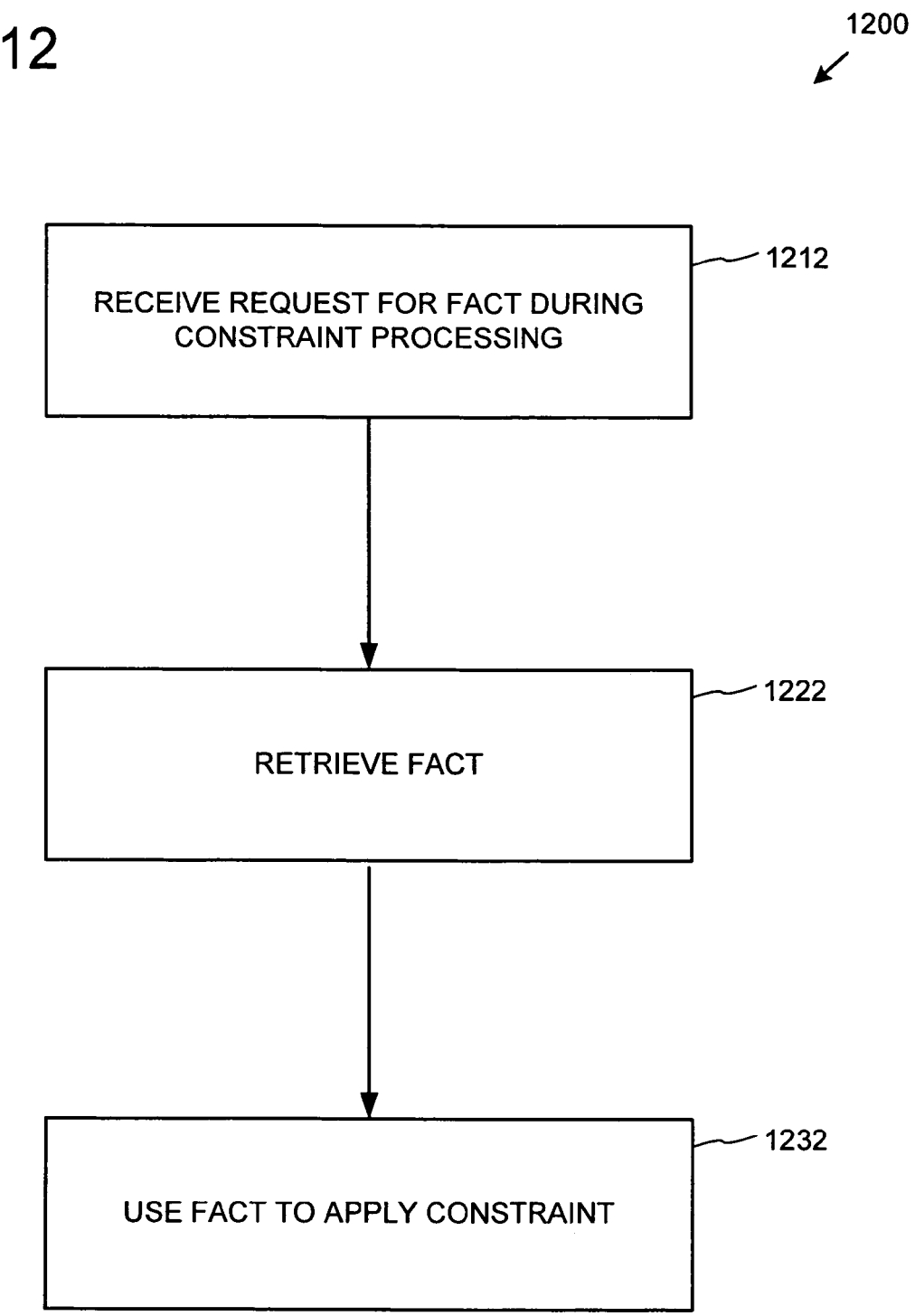
FIG. 12 is a flowchart of an exemplary method for using facts when applying constraints.

FIG. 12 shows an exemplary method 1200 for using facts when applying constraints. At 1212, a request is received for a fact during constraint processing. For example, the security level or department of an actor may be requested. At 1222, the fact is retrieved. Then, at 1232, the retrieved fact is used to apply the constraint.

In practice, the facts can be retrieved (e.g., from one or more knowledge bases) on a periodic basis or one-time basis and stored in a central fact store under control of the workflow services, from which requests can be fulfilled.

In addition, facts can include the current progress state of an activity flow, a document type associated with an activity flow, or some combination thereof.

EXAMPLE 12

Exemplary Composability for Constructing Activity Models

In any of the examples described herein, one or more actions can be composed into a set of actions and associated constraints instantiable to create an activity flow. Such a set of actions is sometimes called an "activity model."

Executing an activity model is sometimes referred to as executing an a priori activity flow because the actions have already been chosen by the activity model designer. If desired, the activity model designer can define the activity model as immutable so that changes can not be made during execution of the associated activity flow.

Figure 13:
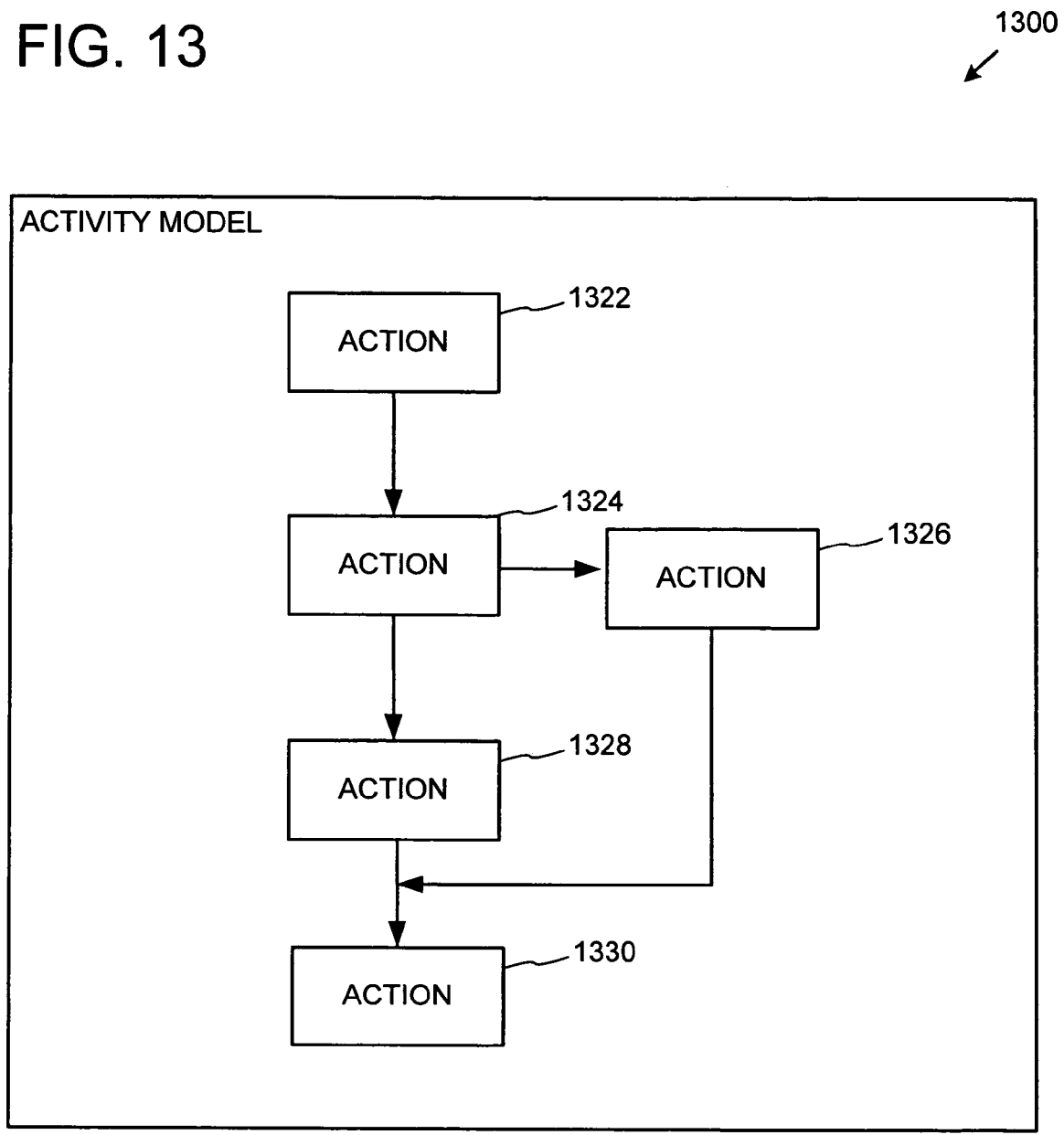
FIG. 13 is a block diagram showing an exemplary activity model.

FIG. 13 shows an exemplary activity model 1300. In the example, a variety of references to action definitions 1322, 1324, 1326, 1328, and 1330 have been assembled into an invocable unit that can be selected for execution by an actor (e.g., as permitted by constraints). For convenience of the user, the activity model 1300 can be given a friendly name by which it can be selected.

Figure 14:
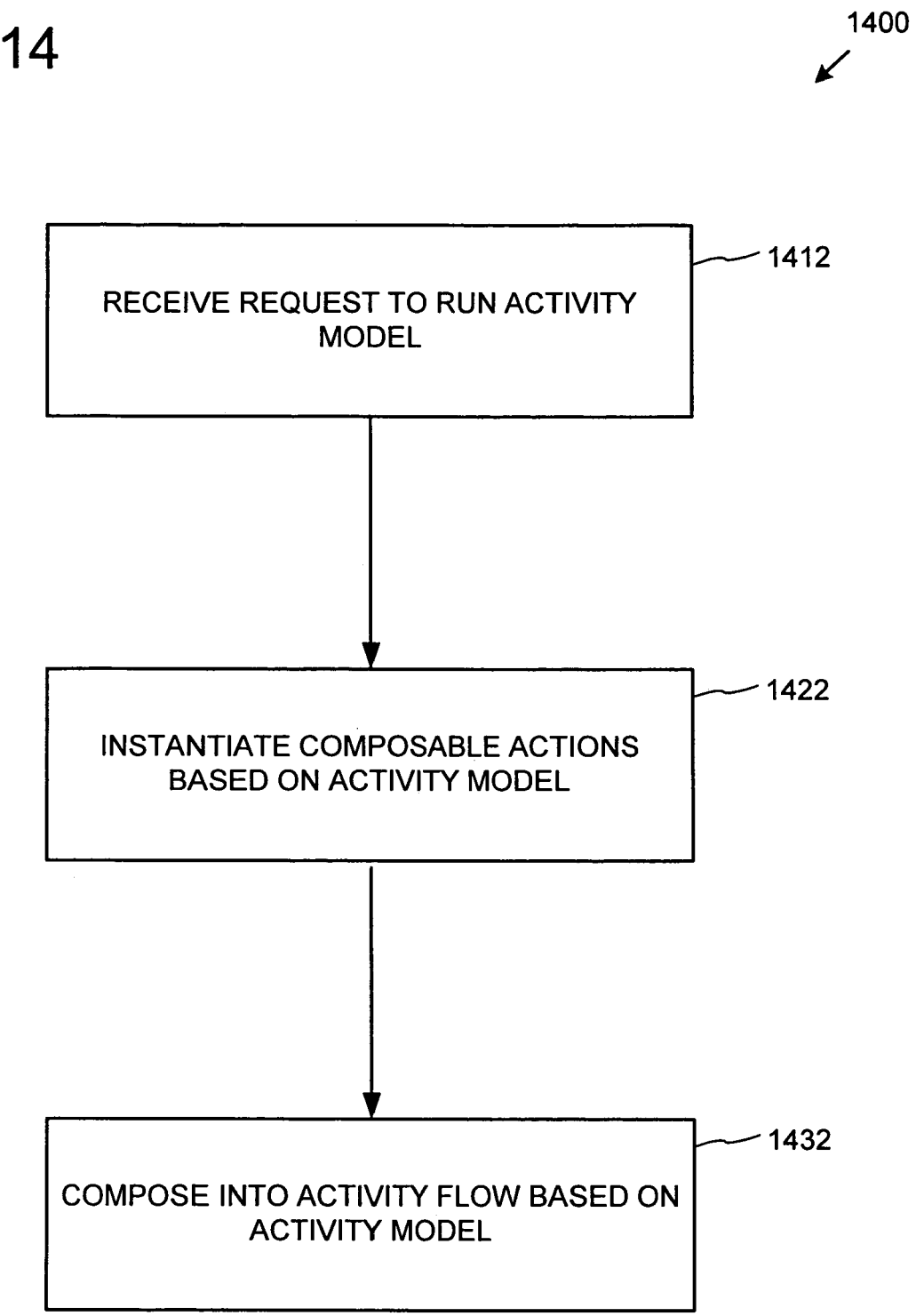
FIG. 14 is a flowchart of an exemplary method for implementing an activity model via composable actions.

FIG. 14 shows an exemplary method 1400 for implementing an activity model via composable actions. At 1412, a request is received (e.g., from a human actor) to run an activity model (e.g., via client software of the workflow services). At 1422, the composable actions of the activity flow are instantiated based on the activity model definition. At 1432, the actions are composed into an activity flow based on the activity flow definition. For example, the sequence of actions can be defined by the activity model so that upon completion of an action, the next action in the activity flow is executed.

EXAMPLE 13

Exemplary Composability for Ad Hoc Selection of Actions

In any of the examples described herein, one or more actions can be composed into a set of actions by a human actor to form an activity flow on an ad hoc basis. For example, a human actor can choose an action for instantiation. If desired, various parameters can be provided to the instantiated action by the human actor (e.g., via an electronic form) appropriate for specific circumstances.

Figure 15:
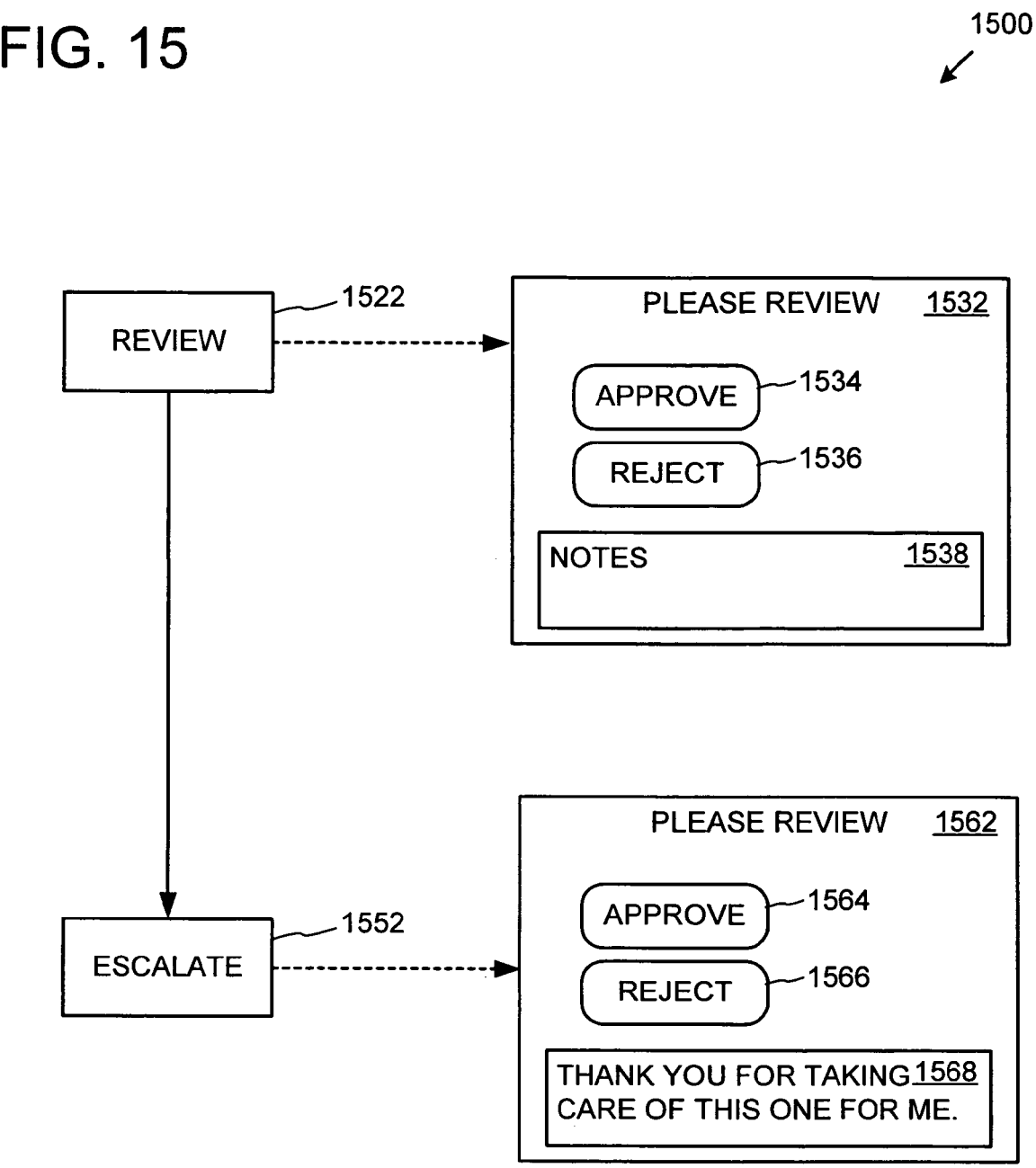
FIG. 15 is a block diagram showing an exemplary activity flow constructed via ad hoc action composition.

FIG. 15 shows an exemplary activity flow 1500 in which a set of actions 1522 and 1552 have been composed on an ad hoc basis. In the example, a user has chosen to instantiate the review action 1522, which results in a task being generated to a target actor. In the example, the task manifests itself to the target actor in the form of a user interface 1532, indicating that the target actor is to review an item (e.g., an attached document). The target actor can select to approve 1534 or reject 1536 the item. Notes 1538 can be provided. In practice, a more comprehensive or other user interfaces can be provided.

However, in the example, the target actor has not reviewed the item in the time desired. Accordingly, an actor (e.g., the same actor who chose to instantiate the review action 1522 or another actor) has chosen to add an escalate action 1552 at execution time of the activity flow (e.g., before the activity flow has completed). Accordingly, a new action 1552 is instantiated and placed into the activity flow 1500. As a result, the task is re-assigned to another target user. If desired, an interrupt message can be sent to the review action 1522, which can take appropriate steps (e.g., canceling the task to the first target actor).

As a result of the new task, a new user interface 1562 appears for the target actor. Again, the user interface can include the elements 1564, 1566, and 1568.

The pictured actions are exemplary only. In practice, a wide variety of ad hoc actions can be provided in light of constraints.

Figure 16:
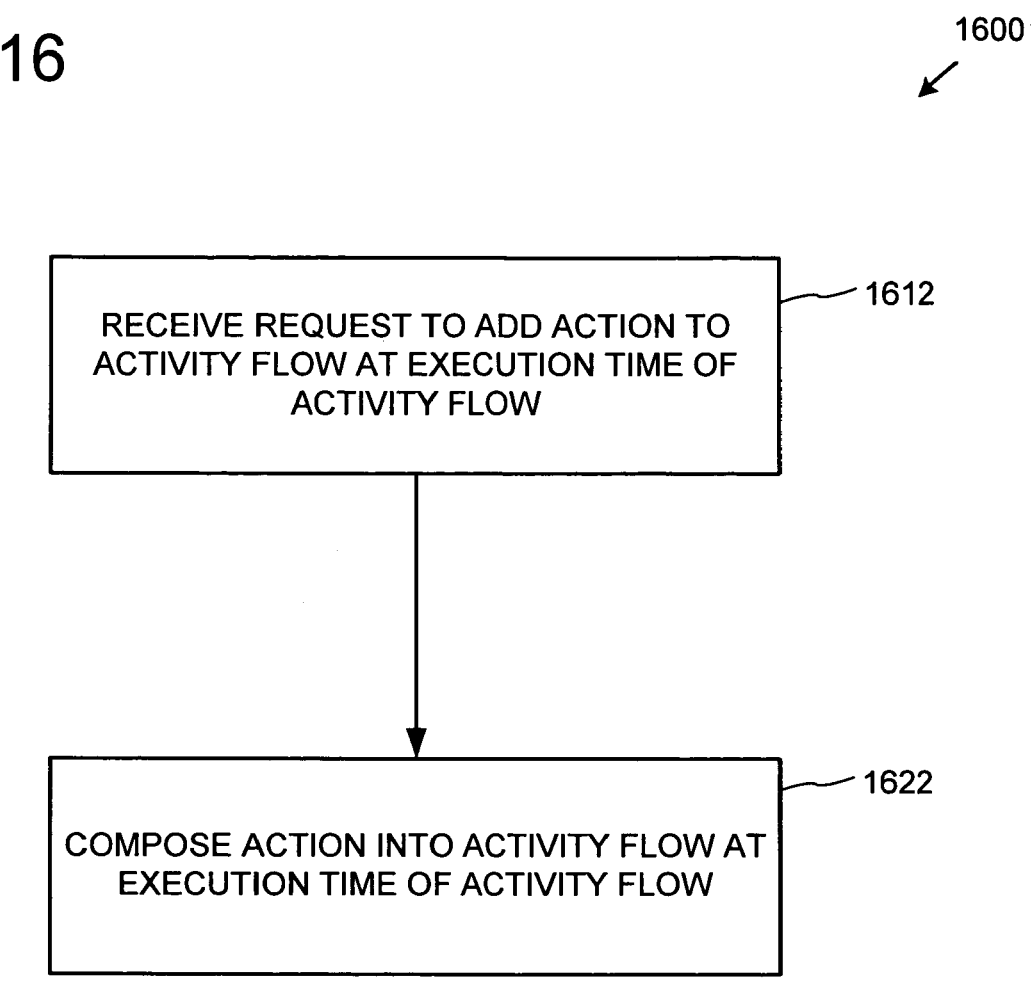
FIG. 16 is a flowchart of an exemplary method for building an ad hoc activity flow via composable actions.

FIG. 16 shows an exemplary method 1600 for implementing ad hoc activity flows. At 1612, a request is received to add an action to an activity flow at execution time of the activity flow. At 1622, the action is composed into the activity flow at execution time of the activity flow.

EXAMPLE 14

Exemplary Composability for Adding Ad Hoc Actions to Activity Model

In addition to supporting activity models for execution of a priori activity flows and ad hoc composition of activity flows, the workflow services can support addition of actions to activity flows based on an activity model on an ad hoc basis.

Figure 17:
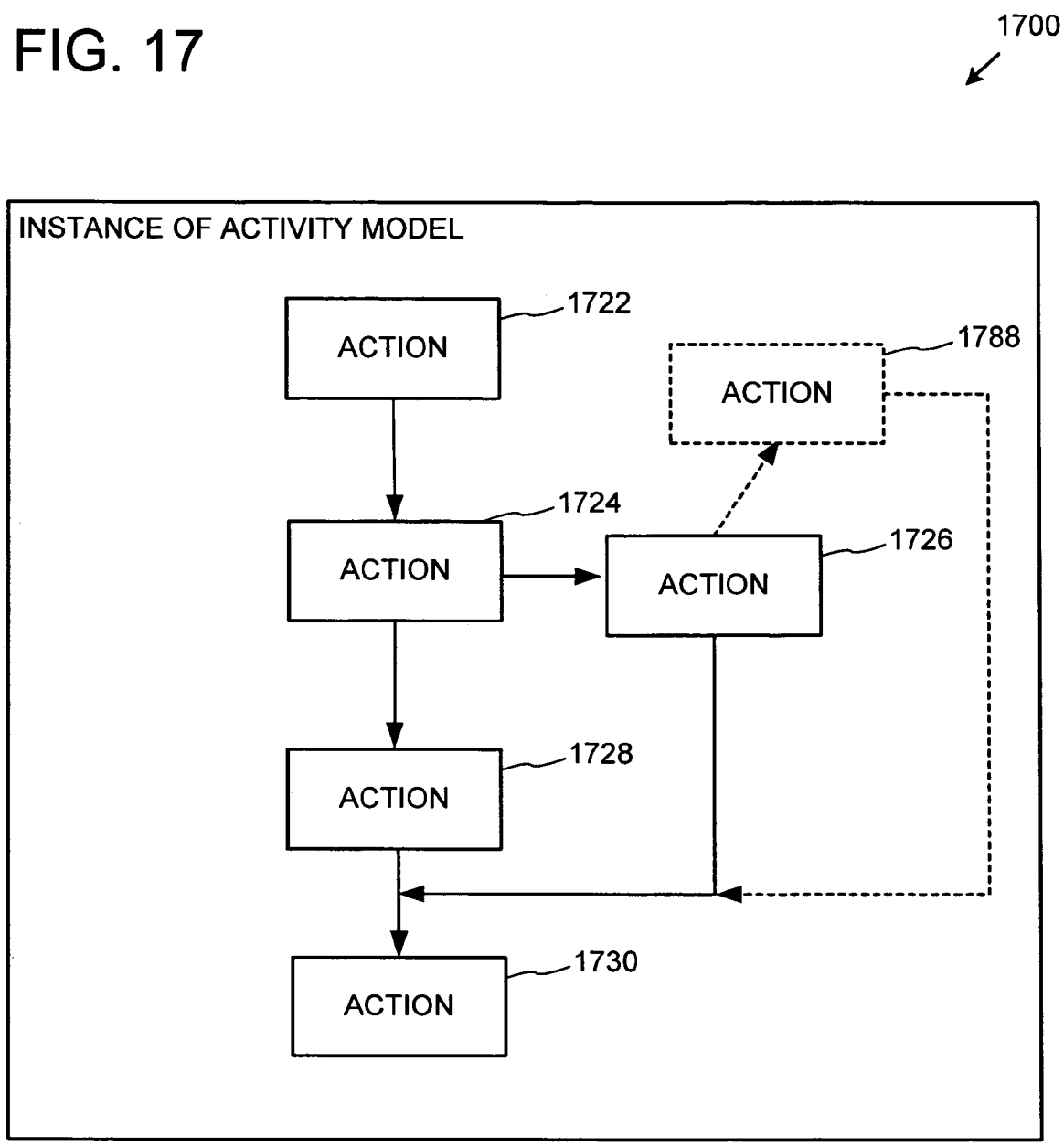
FIG. 17 is a block diagram showing an exemplary ad hoc action added to an activity flow based on an activity model.

FIG. 17 shows an exemplary activity flow 1700 based on an activity model to which an action 1788 has been added on an ad hoc basis. In the example, the activity flow is an instance of an activity model and includes actions 1722, 1724, 1726, 1728, and 1730. Based on the addition of the action 1788, the flow of execution can be altered. Although actors are not shown, the actions can be directed to actors (e.g., to assign tasks).

Figure 18:
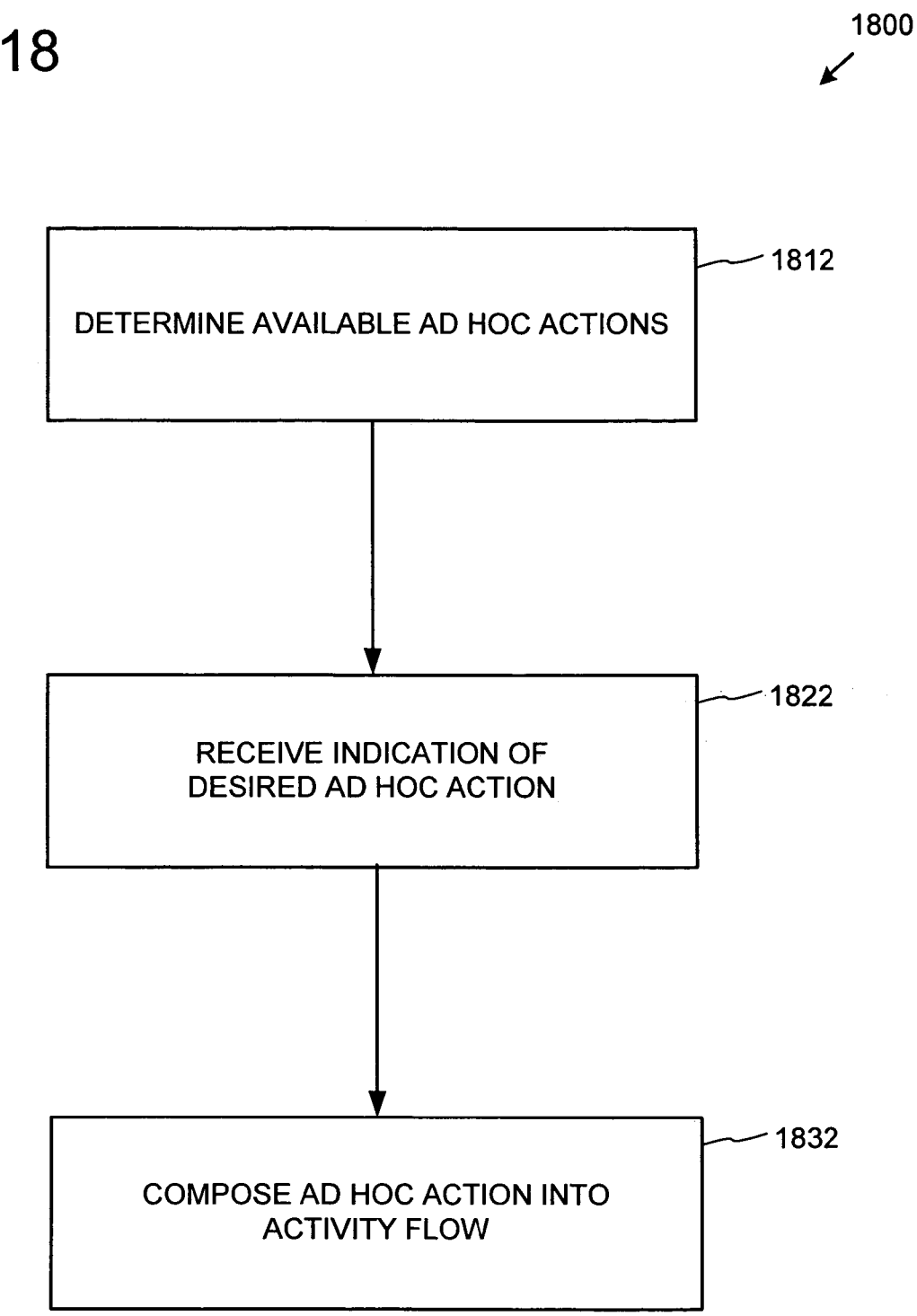
FIG. 18 is a flowchart of an exemplary method for adding ad hoc activities to an activity flow based on an activity model.

FIG. 18 shows an exemplary method 1800 for adding activities to an activity flow based on an activity model on an ad hoc basis. At 1812, the available ad hoc actions are determined (e.g., based on constraints). For example, the available actions can then be sent to client software for presentation to a human actor for selection.

At 1822, an indication of the desired ad hoc action is received. For example, client software can indicate which option a user has selected.

At 1832, the ad hoc action is composed into the activity flow. The tracking service of the workflow services can be updated to indicate that the new action has been added and which actor added it.

EXAMPLE 15

Exemplary Ad Hoc Actions for Tasks

A special task-specific set of ad hoc actions can be made available for tasks. Such ad hoc actions can be presented for selection by an actor whenever a task is involved (e.g., even though they did not appear in the associated activity model). Such ad hoc actions can be selectively presented based on constraints.

Exemplary ad hoc actions for tasks include escalate, delegate, and the like. For example, when presented with a task, an actor can also be presented with the option to escalate or delegate the task. Whether such an option is available and the possible targets can be controlled by constraints. Such options can also be presented in a graphical depiction of the activity flow's progress. In this way, an actor monitoring the progress can easily move execution along by escalation or delegation.

The ability to specify such ad hoc actions related to tasks can make the workflow services more useful because workflow processing is more able to respond to unanticipated circumstances.

EXAMPLE 16

Exemplary Constraints Based on User Identity

Figure 19:
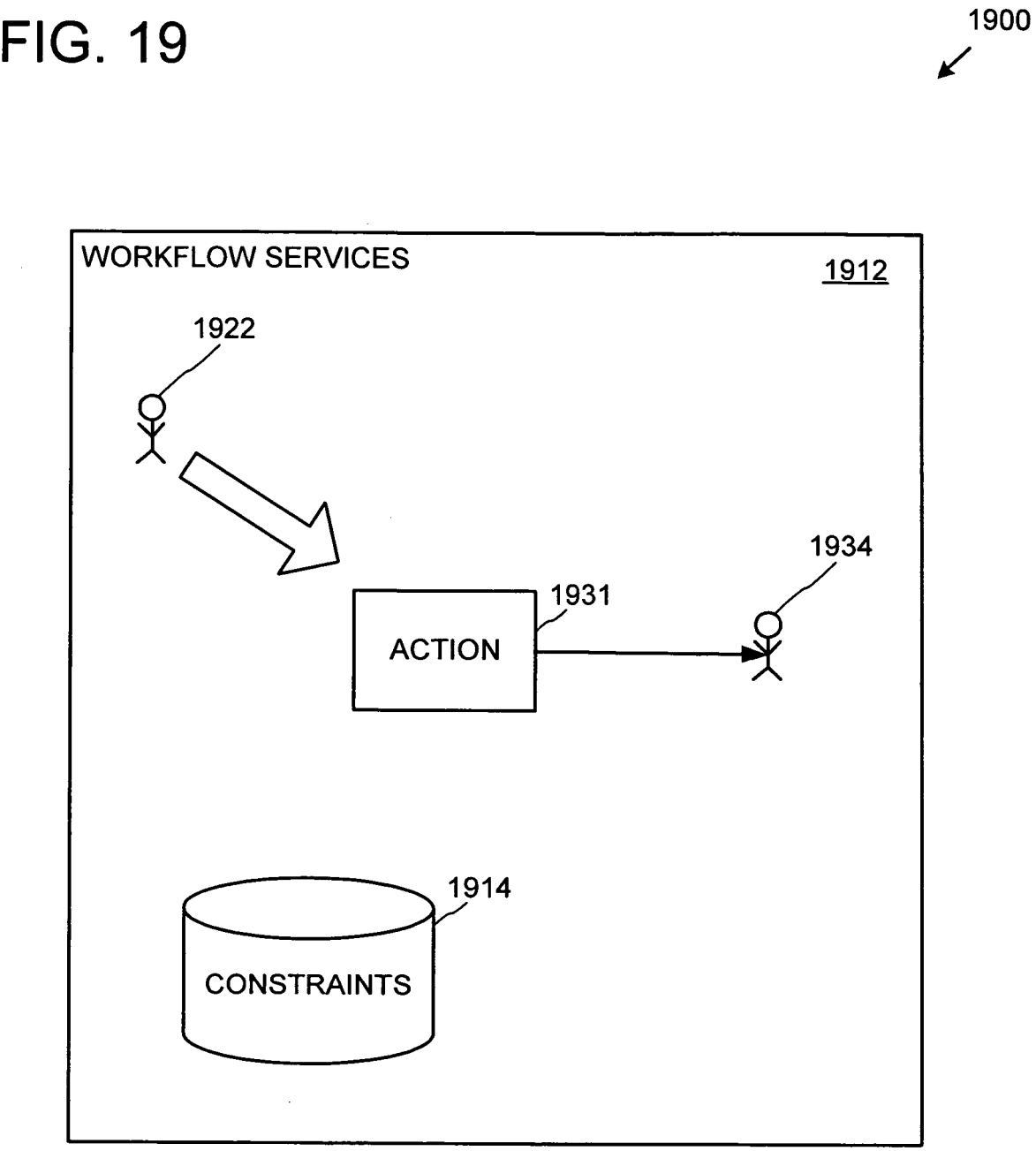
FIG. 19 is a block diagram showing an exemplary constraint based on user identity.

FIG. 19 shows an exemplary arrangement 1900 in which workflow services 1912 supports constraints based on actor identity. In the example, a human actor is represented by an actor 1922 in the workflow services 1912.

The defined constraints 1914 will determine whether the actor 1922 (i.e., the source actor) can select the action 1931 for instantiation and which targets 1934 can be selected. The determination can be based on the identity of the actor 1922. Such identity considerations can include a user name of the actor, which group(s) the actor is a member of, and what role(s) the actor 1922 is a member of. In addition, a relative constraint can specify that the actor 1922 have a relationship to another actor.

Further, the constraints 1914 will determine which target actors 1934 can be specified for the action 1931. The target actor 1934 may be a single actor, a group, or some other designation. The various constraints can associate the action (e.g., via an action id associated with a definition of the action) with permitted instantiating actors and target actors (e.g., for the particular instantiating actor).

In practice, constraints can be implemented so that the human actor associated with the actor 1922 only sees options appropriate as indicated by the constraints 1914. In this way, the human actor is not overwhelmed by too many choices and is guided during workflow processing.

Figure 20:
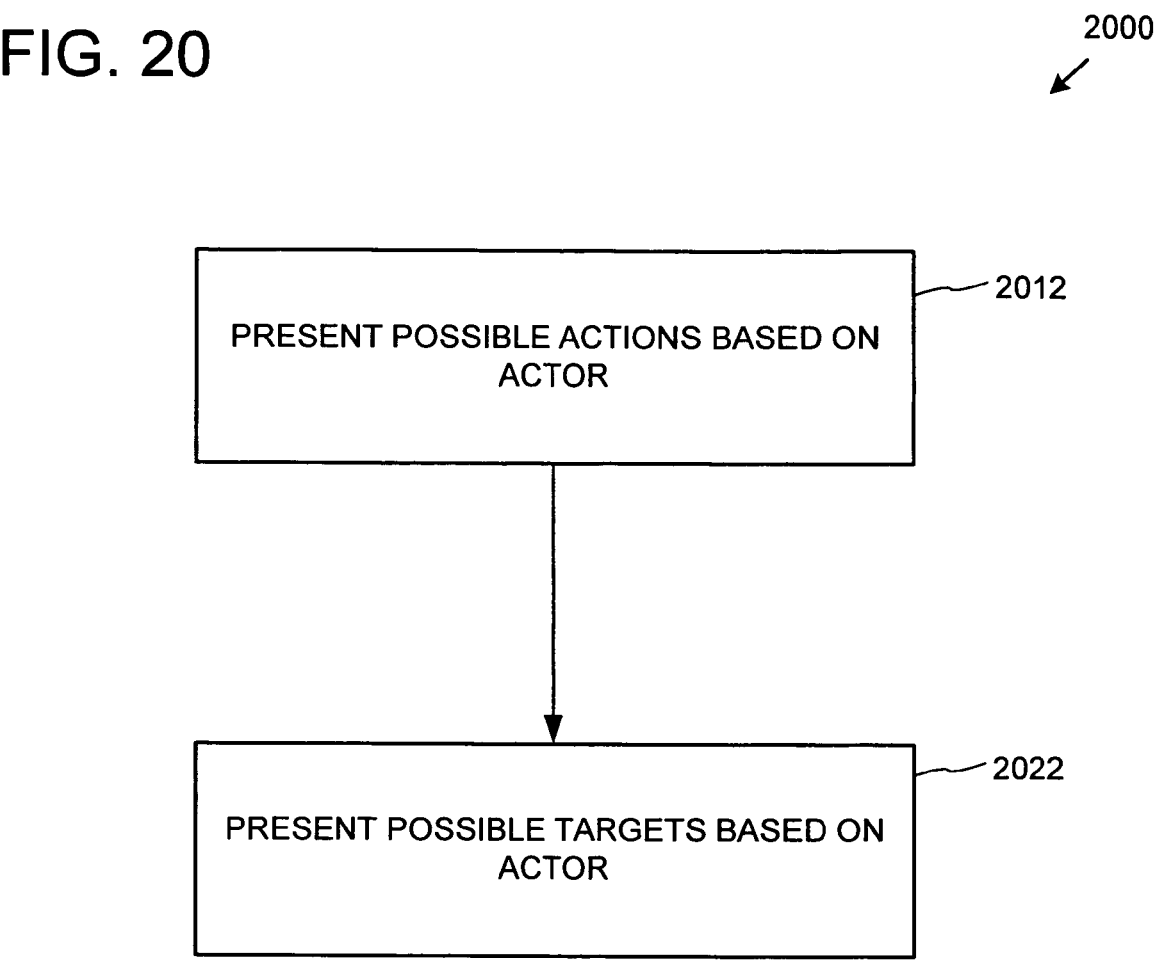
FIG. 20 is a flowchart of an exemplary method for presenting action and target options based on actor constraints.

FIG. 20 shows an exemplary method 2000 for presenting action and target options based on actor constraints. At 2012, the possible actions are presented based on actor identity. At 2022, possible target actors are presented based on actor identity. In practice, the workflow services can control such a presentation by presenting the options for presentation by client software, which can receive the choices (e.g., from a pick list, radio buttons, a combo box, or the like).

EXAMPLE 17

Exemplary Transitive Actions

The workflow can also support constraints for transitive actions. Transitive actions include those actions that can be applied to other actions, which typically already have associated target actors. Examples of transitive actions include delegate and escalate.

Figure 21:
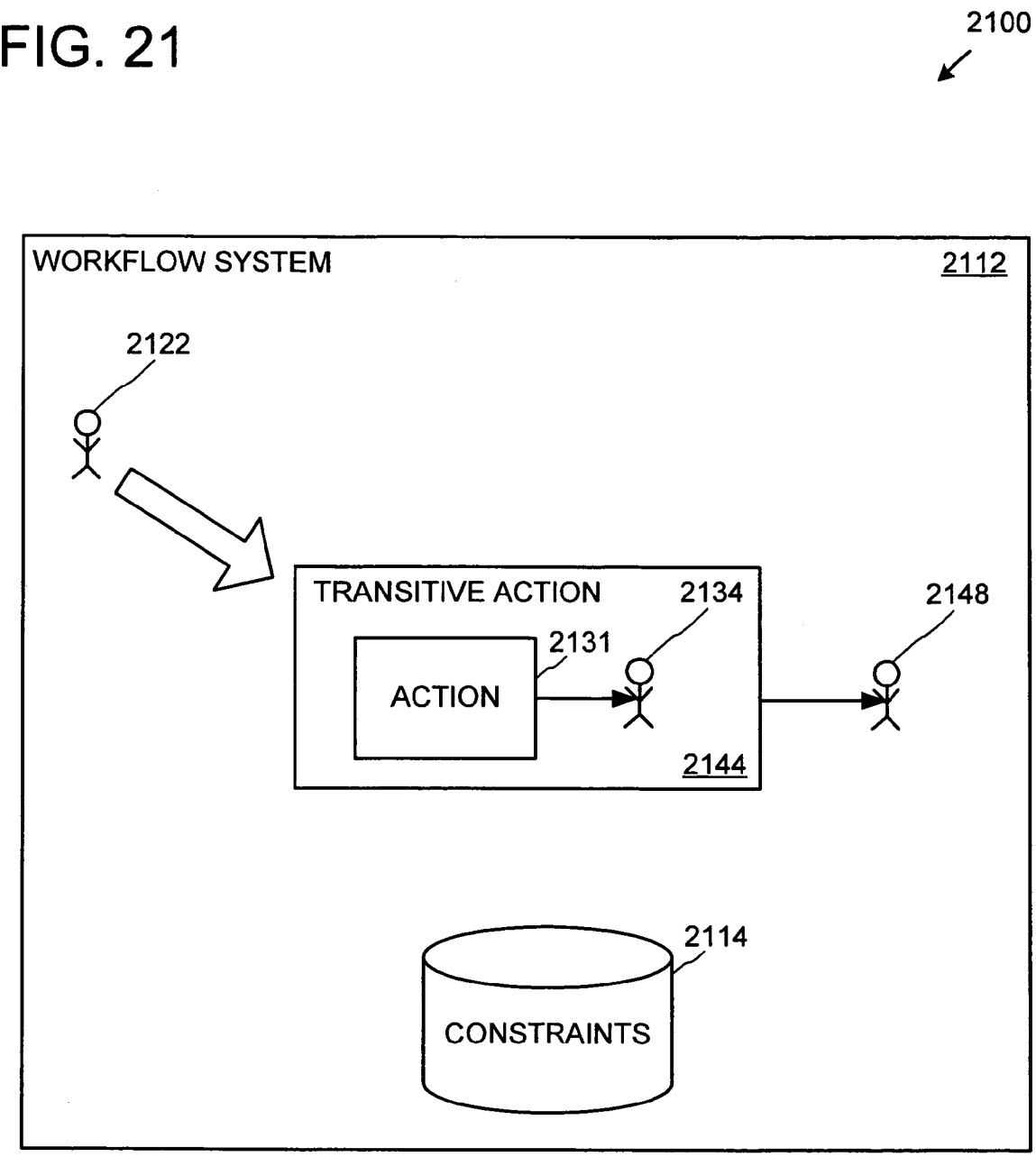
FIG. 21 is a block diagram showing an exemplary constraint for a transitive action.

FIG. 21 shows an exemplary arrangement 2100 in which a workflow system 2112 applies constraints to transitive actions. In the example, an action 2131 has already been applied to a target actor 2134, or "enacted on" actor. An actor 2122 (i.e., the source actor) is applying the transitive action 2144 to the action 2131.

Whether the transitive action 2144 will appear as an option for the actor 2122 will depend on the constraints 2114. Such a determination can be based on the identity of the actor 2122, the type of transitive action 2144, the type of action 2131, the enacted on actor 2134, or some combination thereof. Finally, the permitted targets 2148 can also be controlled via the constraints 2114 (e.g., based on the same considerations or other combination of considerations as for whether the option will appear).

Figure 22:
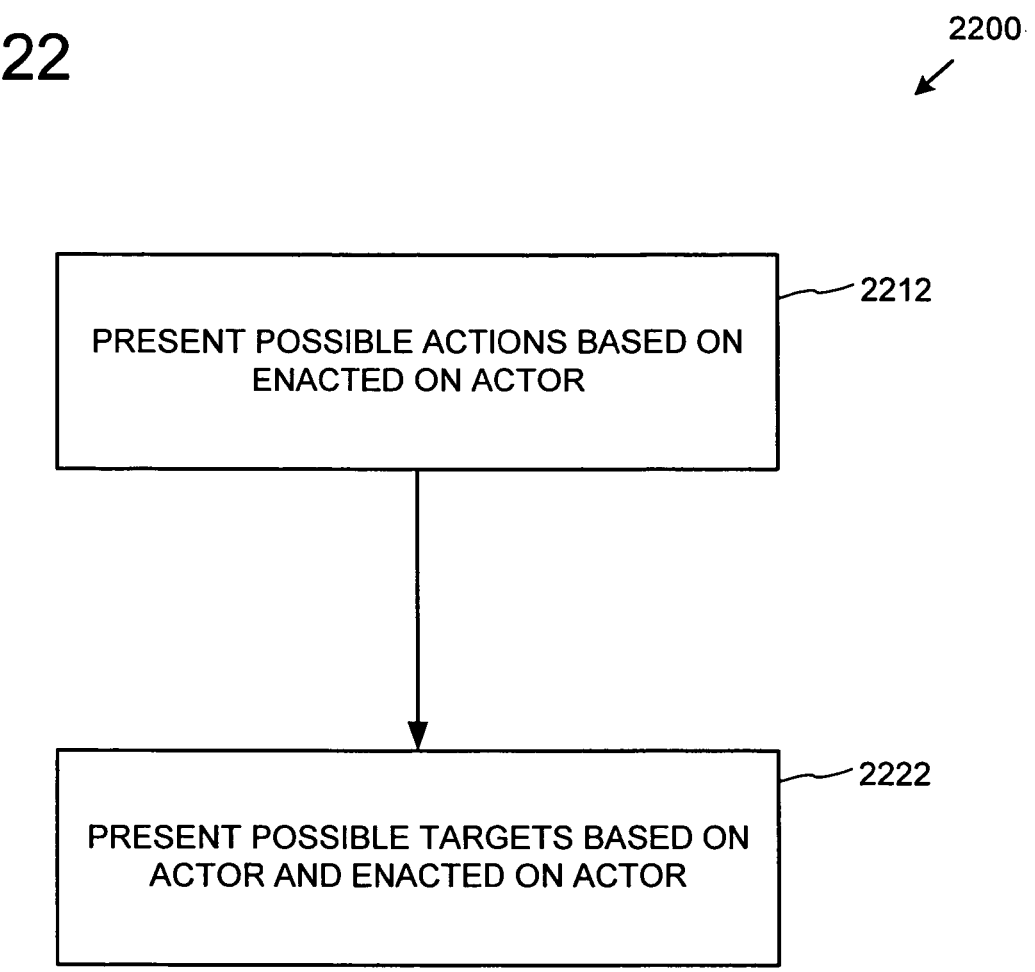
FIG. 22 is a flowchart of an exemplary method for presenting options based on an enacted on actor in light of constraints.

FIG. 22 shows an exemplary method for presenting possible actions and possible targets based on an enacted on user. At 2212, possible actions are presented based at least on an enacted on actor. At 2222, possible targets are presented based at least on an enacted on actor.

EXAMPLE 18

Exemplary Tracking

Figure 23:
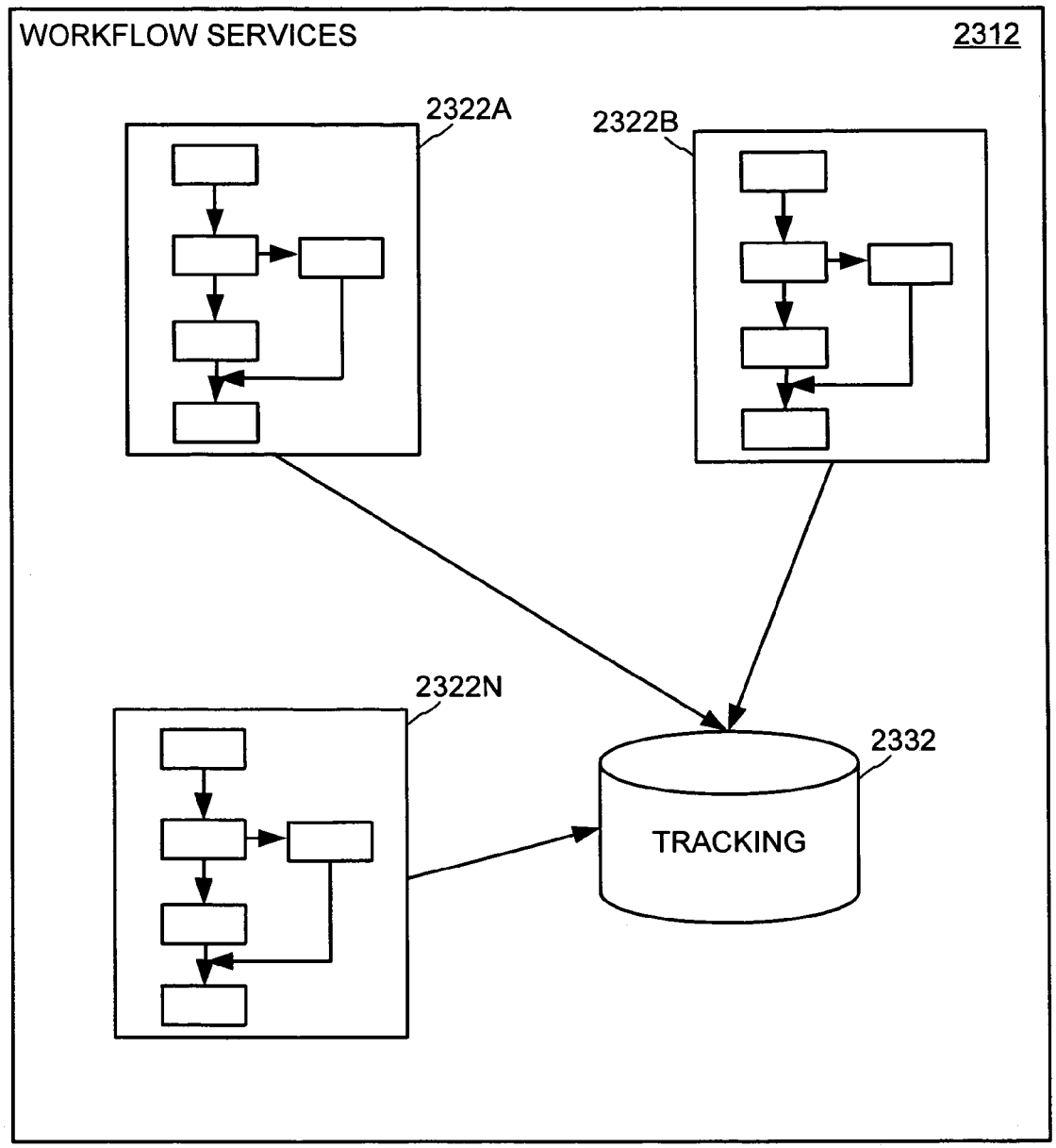
FIG. 23 is a block diagram showing an exemplary tracking arrangement.

FIG. 23 shows an exemplary arrangement 2300 in which the workflow services 2312 support tracking. In the example, the workflow services 2312 support execution of one or more activity flows 2322A–2322N. Information about the executing flows can be stored in a tracking database 2332 for later retrieval. For example, indications of messages to and from actions can be stored by using a custom interceptor to intercept and store information indicating the messages. In addition, other information can be stored for construction of status reports indicating the progress of workflow processing.

Figure 24:
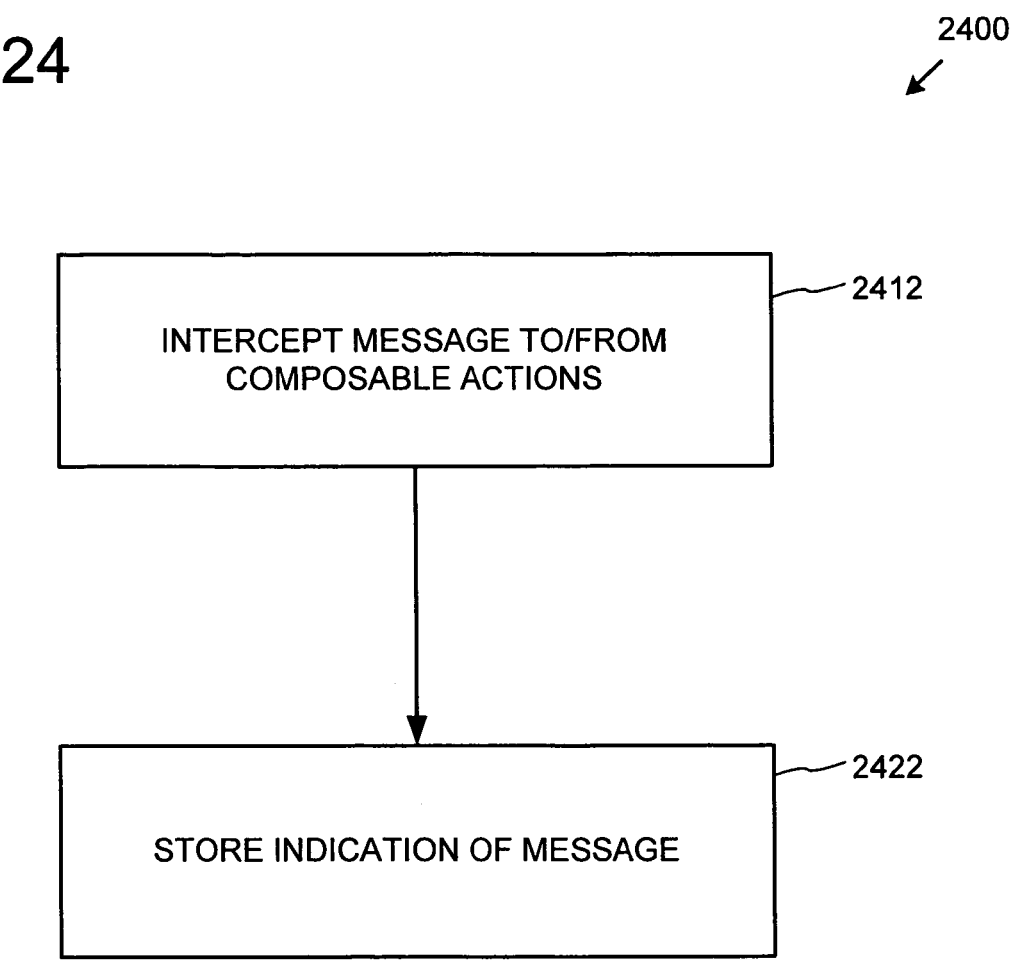
FIG. 24 is a flowchart of an exemplary method for tracking status of an activity flow of composable actions.

FIG. 24 shows an exemplary method 2400 for tracking status of an activity flow of composable actions. At 2412, a message to or from a composable action is intercepted. At 2422, an indication of the message is stored in a tracking database.

EXAMPLE 19

Exemplary Portrayal of Workflow Status

Figure 25:
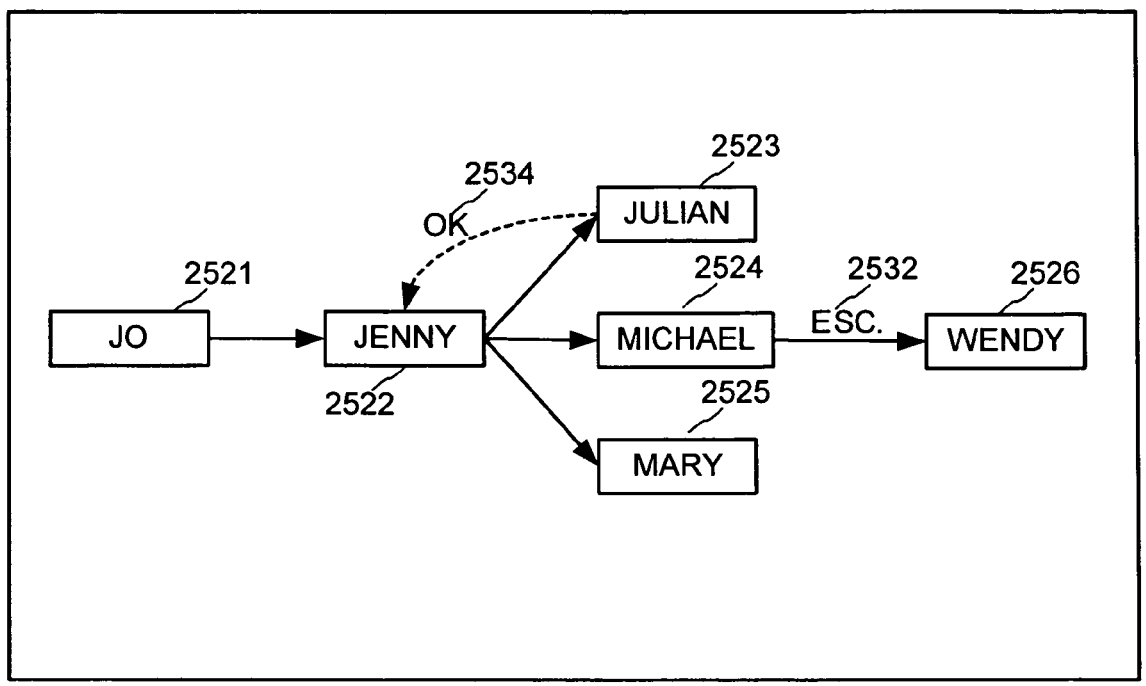
FIG. 25 is a screen shot showing an exemplary graphical presentation of workflow status based on tracking.

FIG. 25 shows an exemplary user interface 2500 presenting a graphical presentation of workflow status based on tracking (e.g., collected messages). In the example, the various boxes 2521, 2522, 2523, 2524, 2525, and 2526 indicate actors participating in the workflow processing (e.g., an activity flow) who have assigned or been assigned tasks. In addition, the user interface 2500 can present communication between the actors. For example, an arrow can include an indication 2534 that Julian has approved a document. Such indications can be textual, iconic, or the like. Another arrow includes an indication 2532 that a task has been escalated.

Figure 26:
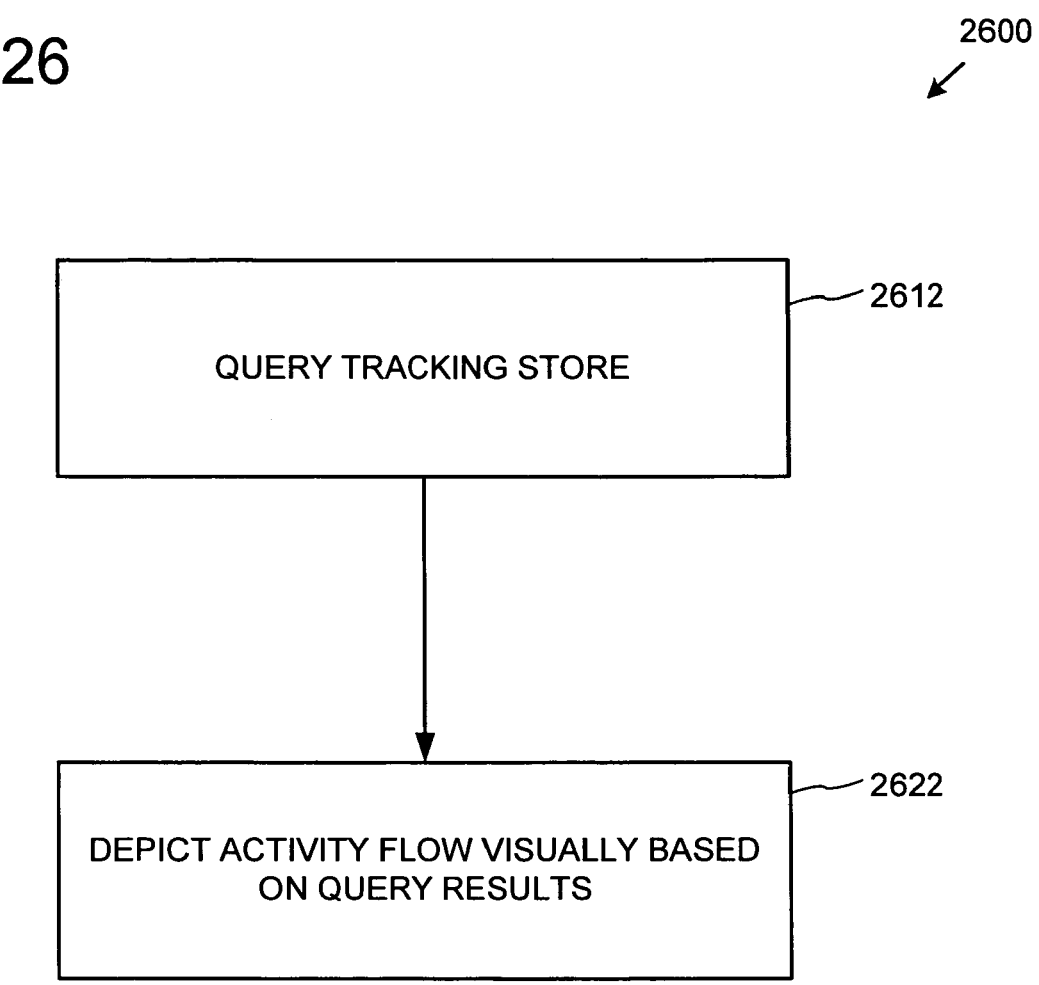
FIG. 26 is a flowchart of an exemplary method for presenting activity flow status graphically.

FIG. 26 shows an exemplary method 2600 for presenting activity flow status. At 2612, the tracking store is queried. At 2622, based on the query results, the activity flow is depicted visually.

In practice, a wide variety of user interfaces can be presented. In addition, the user interface can present further options for human actors by which they can participate in the workflow as they monitor it. For example, an option to escalate or interrupt an option can be presented.

EXAMPLE 20

Exemplary Implementation as Web Services

In any of the examples described herein, the workflow services can be presented to clients as a web service. For example, user interfaces can be provided in the form of Hyper Text Markup Language (HTML), which can be rendered by the client.

EXAMPLE 21

Exemplary Pervasive Interface Techniques

In any of the examples described herein, the workflow services can be utilized via a pervasive user interface. For example, the user interface for workflow services can be integrated into common software programs, such as an email program or a word processing program. In this way, common, familiar software can be used as a client for the workflow services. Communication can be accomplished by sending XML messages (e.g., according to the SOAP protocol), and user interfaces can be depicted via HTML.

Figure 27:
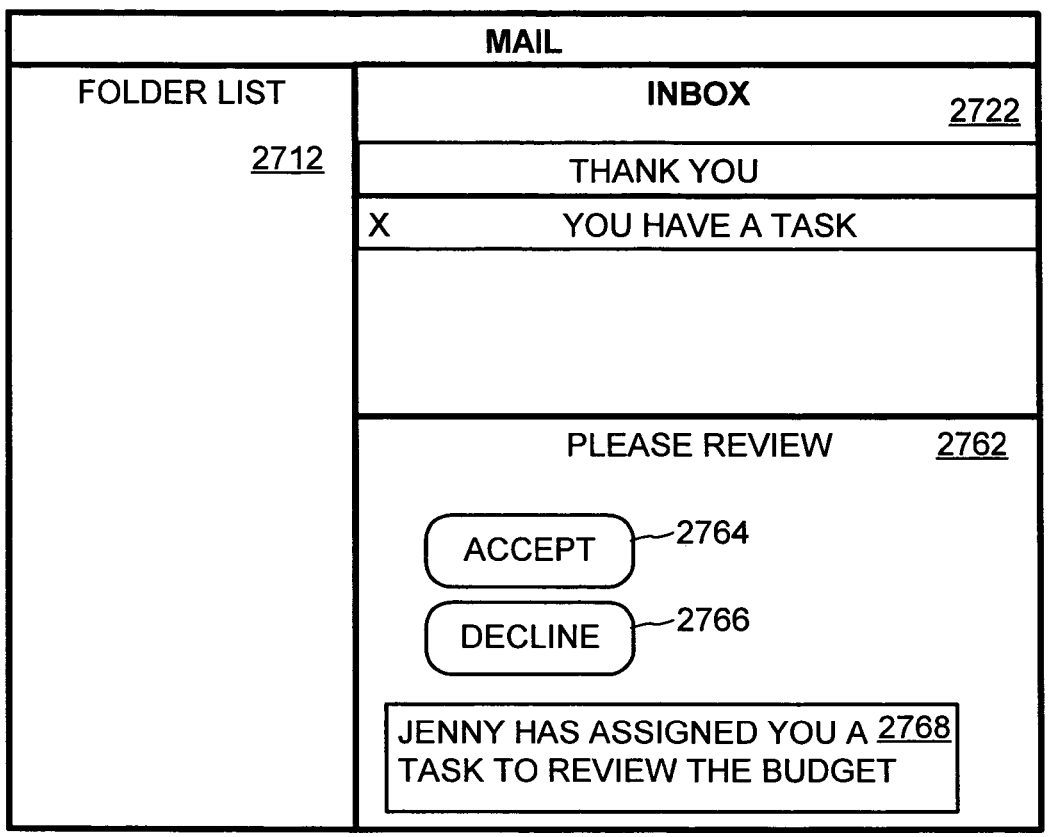
FIG. 27 is a screen shot showing an exemplary implementation of a pervasive workflow user interface within an email user interface.

FIG. 27 shows an exemplary user interface 2700 in which workflow services are presented as part of a user interface of an email program. In the example, an email program includes a familiar folder list 2712 and an inbox 2722. As part of the inbox, a task appears. When selected, a preview of the email appears in the preview pane 2762.

The user interface indicates that the task for the target actor (e.g., the user reviewing email) is to review a budget document. The user interface elements 2764, 2766, and 2768 can be used to communicate back to the workflow services. For example, upon activation of the pushbutton 2764, a message is sent back to the action that has initiated the task to the target actor. Appropriate steps can then be taken by the associated activity flow.

Figure 28:
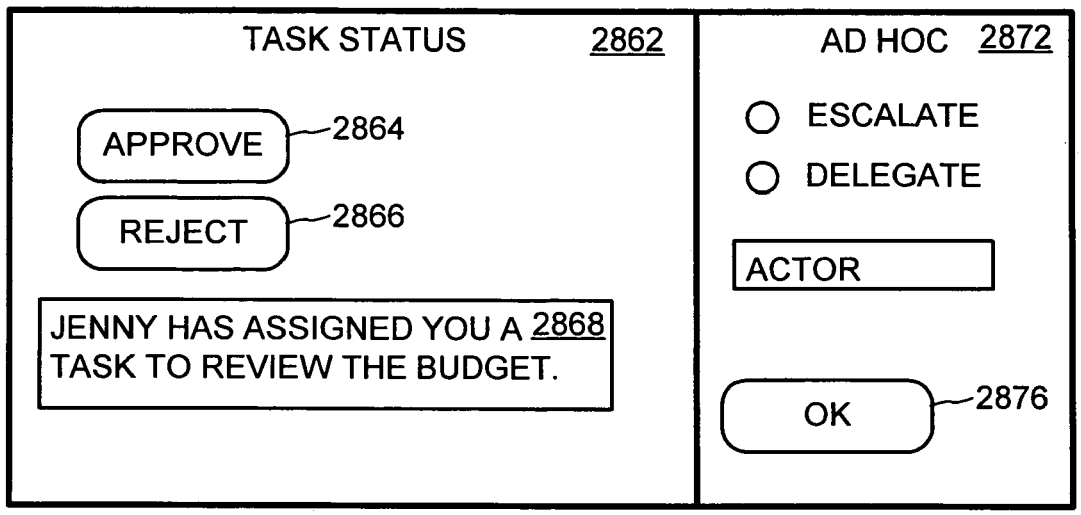
FIG. 28 is a screen shot showing an exemplary implementation of a pervasive workflow user interface for accepting a task.

Instead of the pane 2762, the pane 2800 of FIG. 28 can be shown. In the example, in addition to the standard task options of sub-pane 2862 (e.g., the user interface elements 2864, 2866, and 2868), options for ad hoc actions appear in the sub-pane 2872 (e.g., the user interface element 2876).

Figure 29:
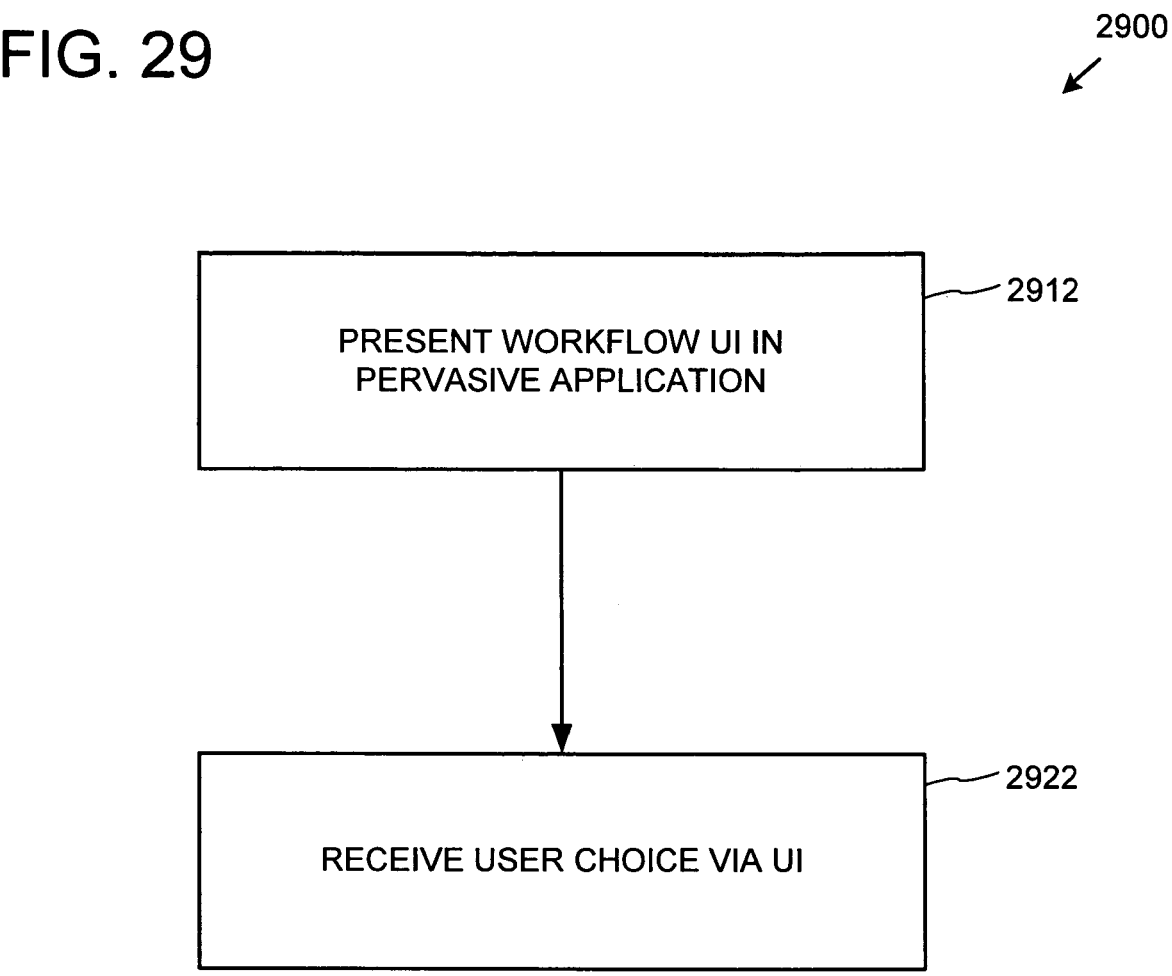
FIG. 29 is a flowchart of an exemplary method for presenting and accepting choices via a pervasive workflow user interface.

FIG. 29 shows an exemplary method 2900 for presenting and accepting choices via a pervasive workflow user interface. At 2912, a workflow-related user interface is presented in the pervasive application. At 2922, a user (e.g., human actor) choice is received via the user interface.

Figure 30:
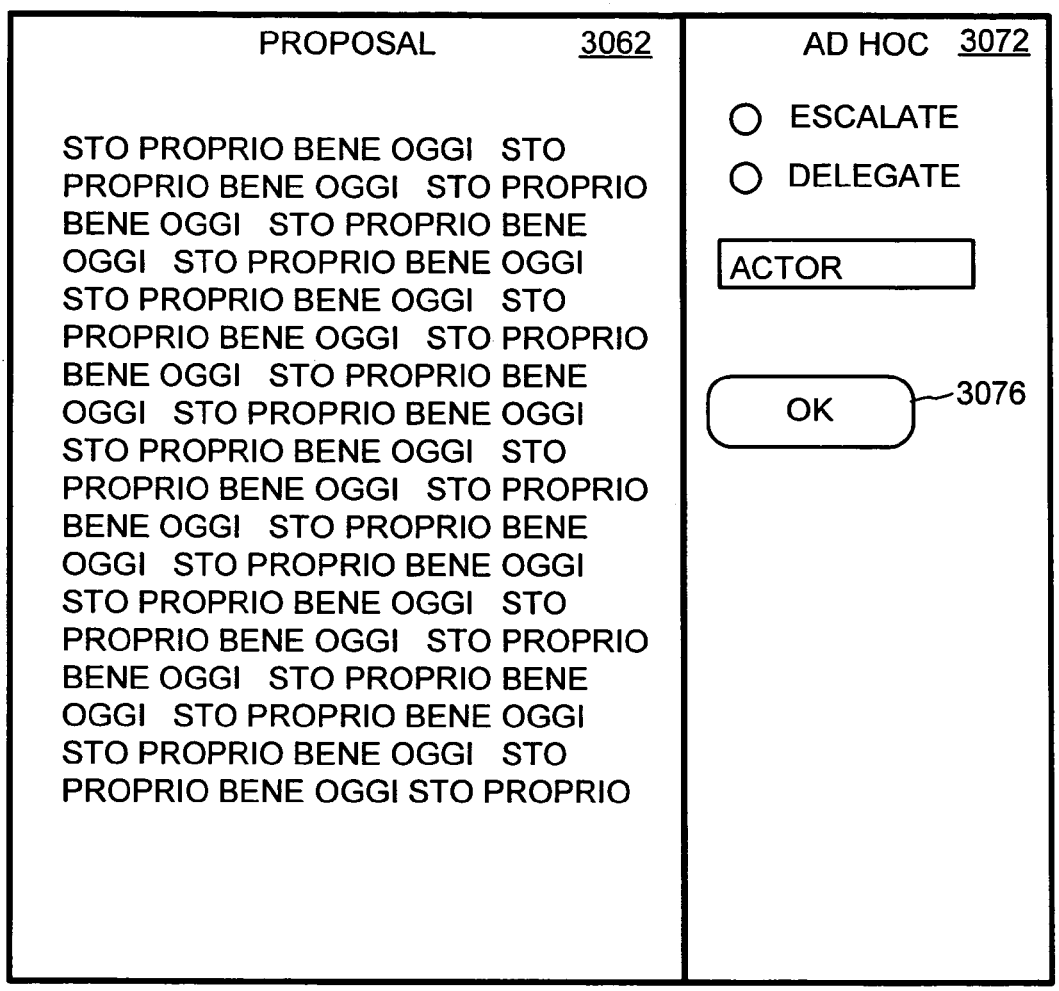
FIG. 30 is a screen shot showing an exemplary implementation of a pervasive workflow user interface for approving or rejecting an item within a word processing user interface.

FIG. 30 shows a user interface 3000 in which user interface elements for accessing the workflow services are presented as integrated into a document editing (e.g., word processing or spreadsheet) program. In the example, the document is presented in the document pane 3062. Alongside the document pane 3062 appear workflow options 3072. In the example, ad hoc actions appear by which an actor can select an action and the target actor. Initiation of the action can be accomplished via the user interface element 3076. In practice, additional or different options can be presented (e.g., for approving the document being edited).

EXAMPLE 22

Exemplary Discoverability

Figure 31:
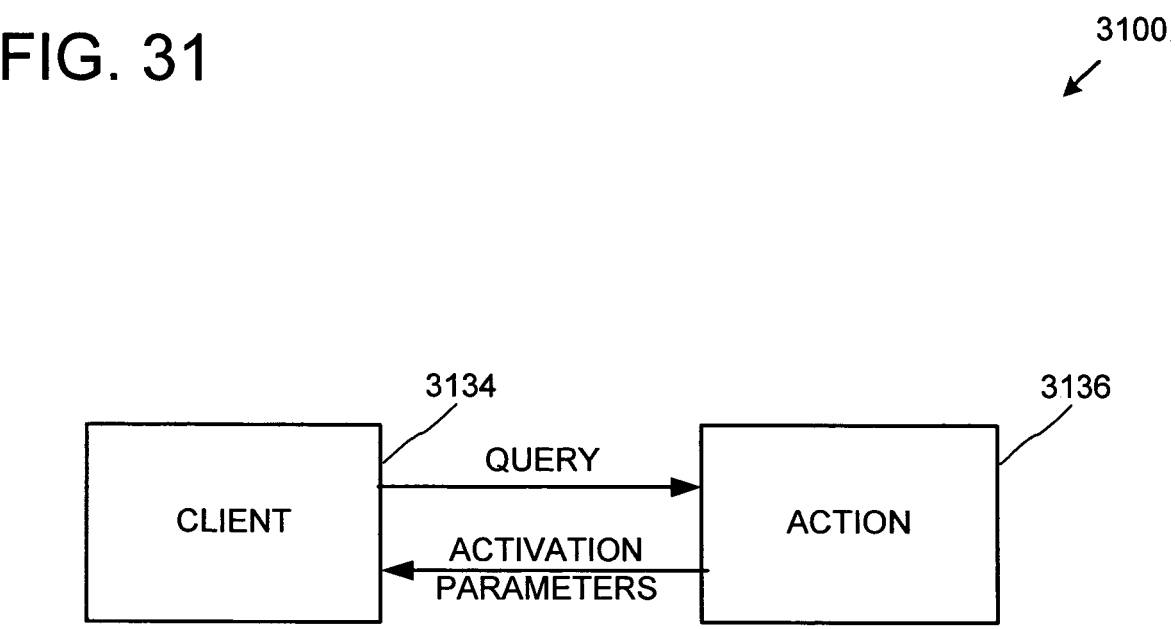
FIG. 31 is a block diagram showing an exemplary arrangement for discoverability of a specification of parameters for activating an action.

FIG. 31 shows an exemplary arrangement 3100 by which a specification of the activation parameters for activating an action 3136 can be obtained. In the example, client software 3134 (e.g., an action, the workflow services, or some other software) send a query to the action 3136, which responds with a specification of the parameters for activating the action (e.g., the parameter list specified by the developer of the action 3136). In practice, because the action 3136 is not yet instantiated, the query (e.g., specifying an action type) can be fielded by the workflow services, which can consult a list of action types and the parameters for each to determine the activation parameter specification.

The specification can be provided in the form of or be transformed into an HTML form by which the parameters can be collected. For example, a review action may specify that targets are to be provided and thus generate an appropriate HTML form for completion by an actor. Constraints can be used to fill in the appropriate target actors.

Figure 32:
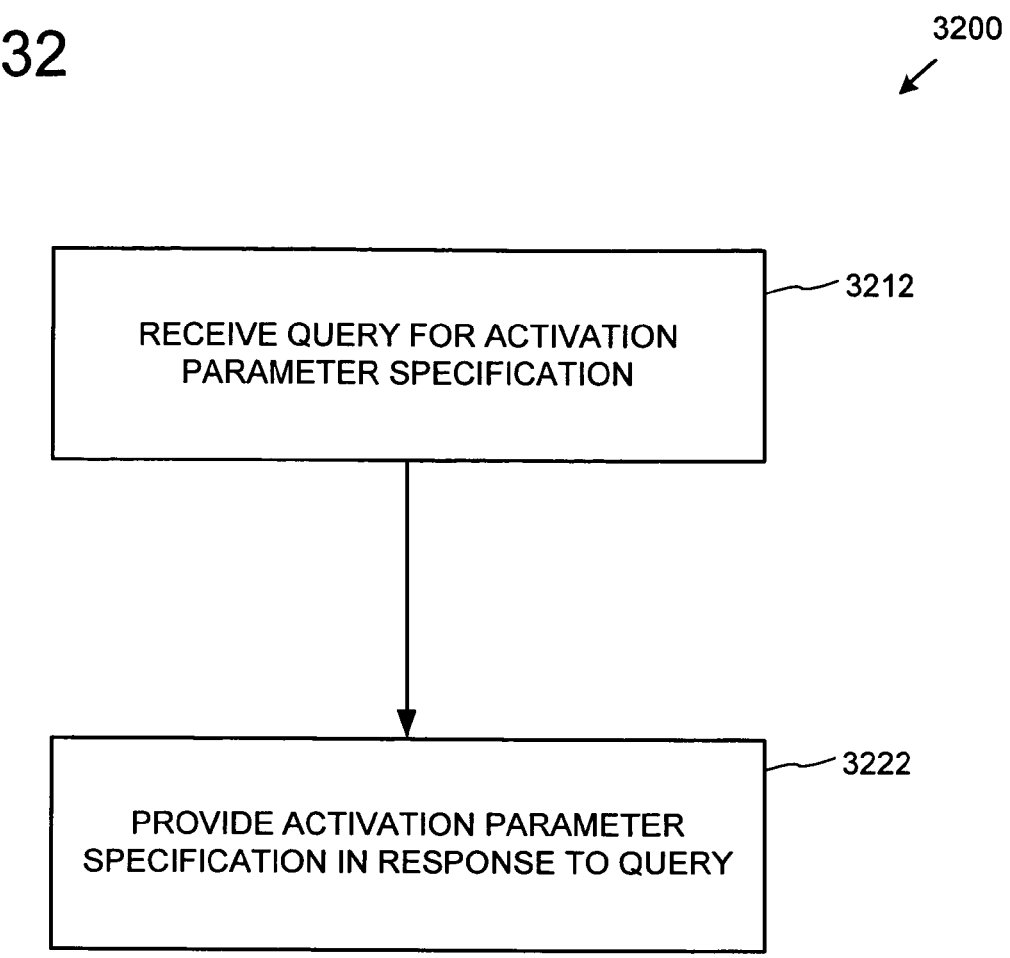
FIG. 32 is a flowchart of an exemplary method for discovering an activation parameter specification for an action.

FIG. 32 shows an exemplary method 3200 for discovering an activation parameter specification for an action. At 3212, a query for the activation parameter specification is received. At 3222, the specification is provided in response to the query.

A similar approach can be used for discoverability of a parameter specification for an activity model. Discoverability can be performed at execution time of an action or an activity flow.

EXAMPLE 23

Exemplary Action Template

Figure 33:
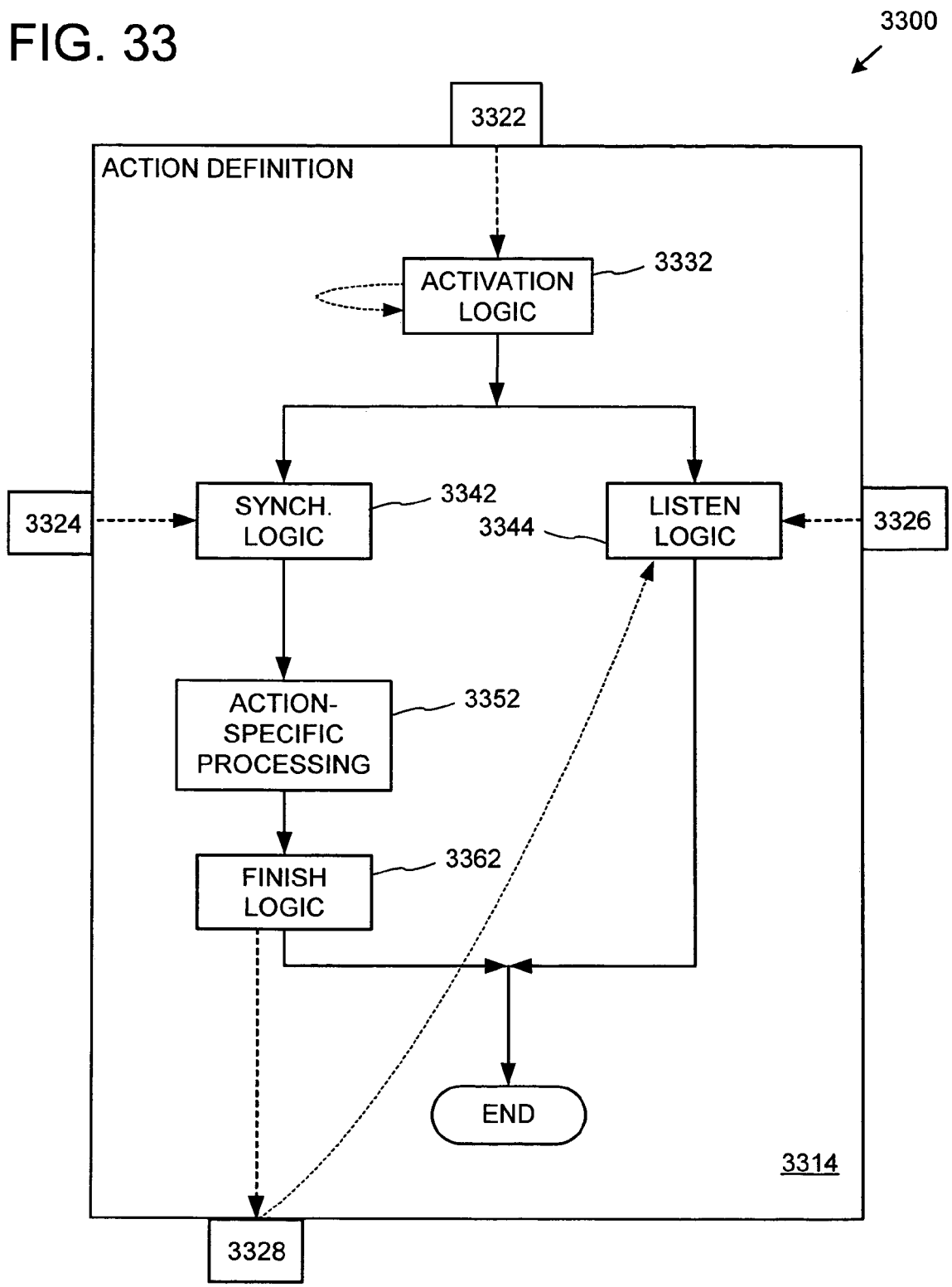
FIG. 33 is a block diagram showing an exemplary template for supporting a pattern for a composable action.

In order to facilitate development of actions, a template can be provided to developers. FIG. 33 shows an exemplary arrangement 3300 involving a template action definition 3314. The template can be edited in a visual programming language which can then generate appropriate executable code for the action.

In the example, the interfaces of the action are represented by pins 3322, 3324, 3326, and 3328. The template accounts for receipt of an activation message by the activation interface 3322. Activation logic 3332 encapsulated by the action receives the activation message and loops back the activation response message to itself, in order to initialize values that correlate other messages received by the action template.

The template 3314 further accounts for dependent composition (e.g., synchronization scenarios). For example, the synchronization logic 3342 and the listen logic 3344 can be executed in parallel. If the action has been composed in a dependent way (e.g., its further execution depends on receiving a message from another action), the synchronization logic 3342 can block execution until a message is received from the synchronization interface 3324.

In parallel, the listen logic 3344 can listen for interrupt or finish messages. If an interrupt message is received from the interrupt interface 3326, interrupt logic (e.g., rolling back state) can be executed.

If not blocked or unblocked, the action-specific processing (e.g., business logic) 3352 can be executed. Finally, finish logic 3362 can be executed, and a finish message sent to the finish interface 3328. The message is received by the action in the listen logic 3344 and causes the parallel branch to complete as well.

In practice, additional or other logic can be included. After development is completed, the action definition can be installed into the workflow services and appropriate constraints defined as associated with the action.

EXAMPLE 24

Exemplary Execution of Workflow Technologies

FIGS. 34, 35, 36, 37 show an exemplary execution of workflow technologies. In the example, a customer sends a request for proposal (RFP) to an account manager, who involves a team of experts to coordinate a response to the RFP.

Figure 34:
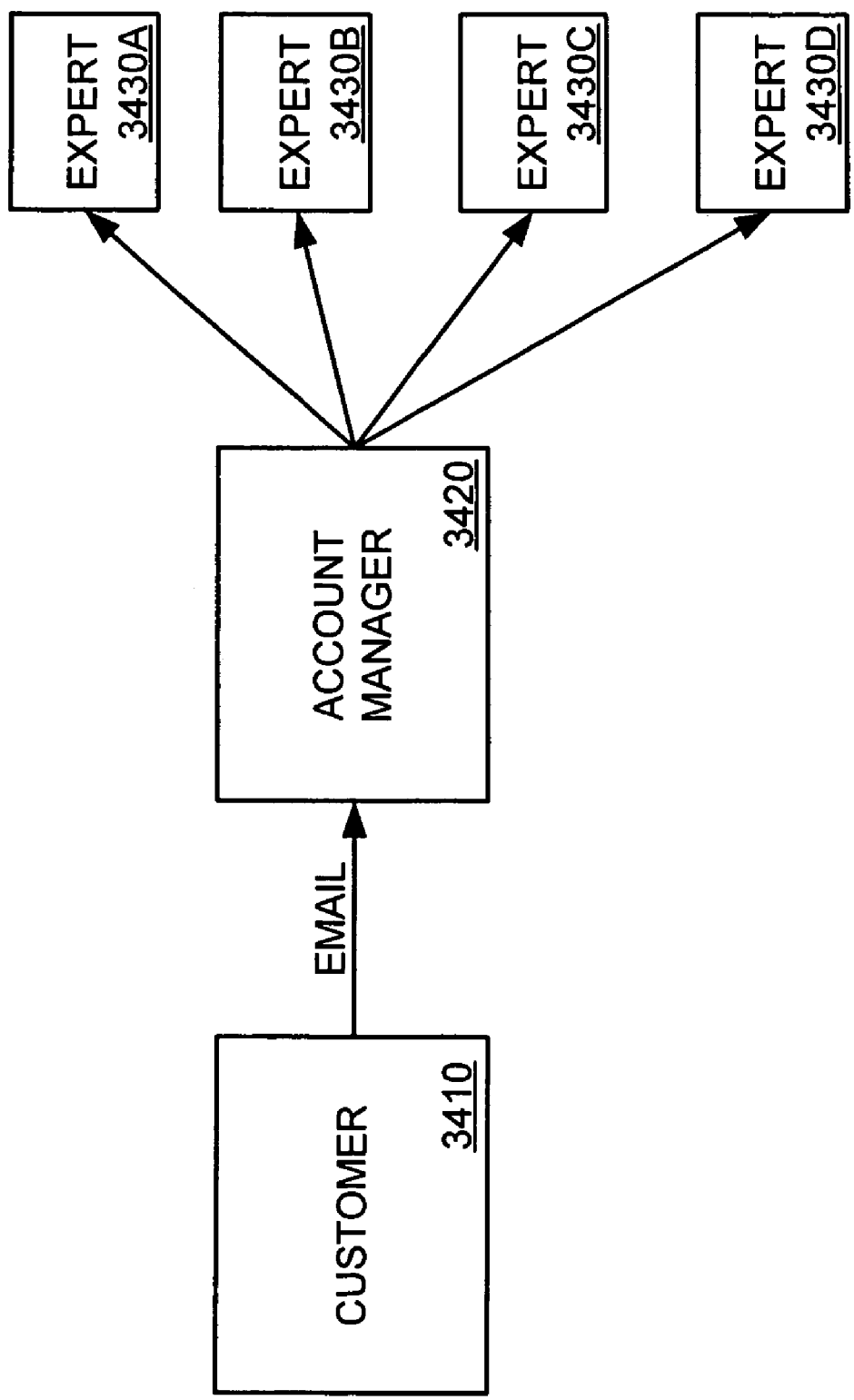
FIGS. 34, 35, 36, and 37 show an exemplary execution of workflow technologies.

FIG. 34 shows the actors involved. A customer 3410 sends an account manager 3420 an RFP document (e.g., via email). For example, the document can be a word processing document. The account manager can send tasks to the experts 3430A–3430D to complete processing necessary to respond to the RFP.

Figure 35:
Figure 36:
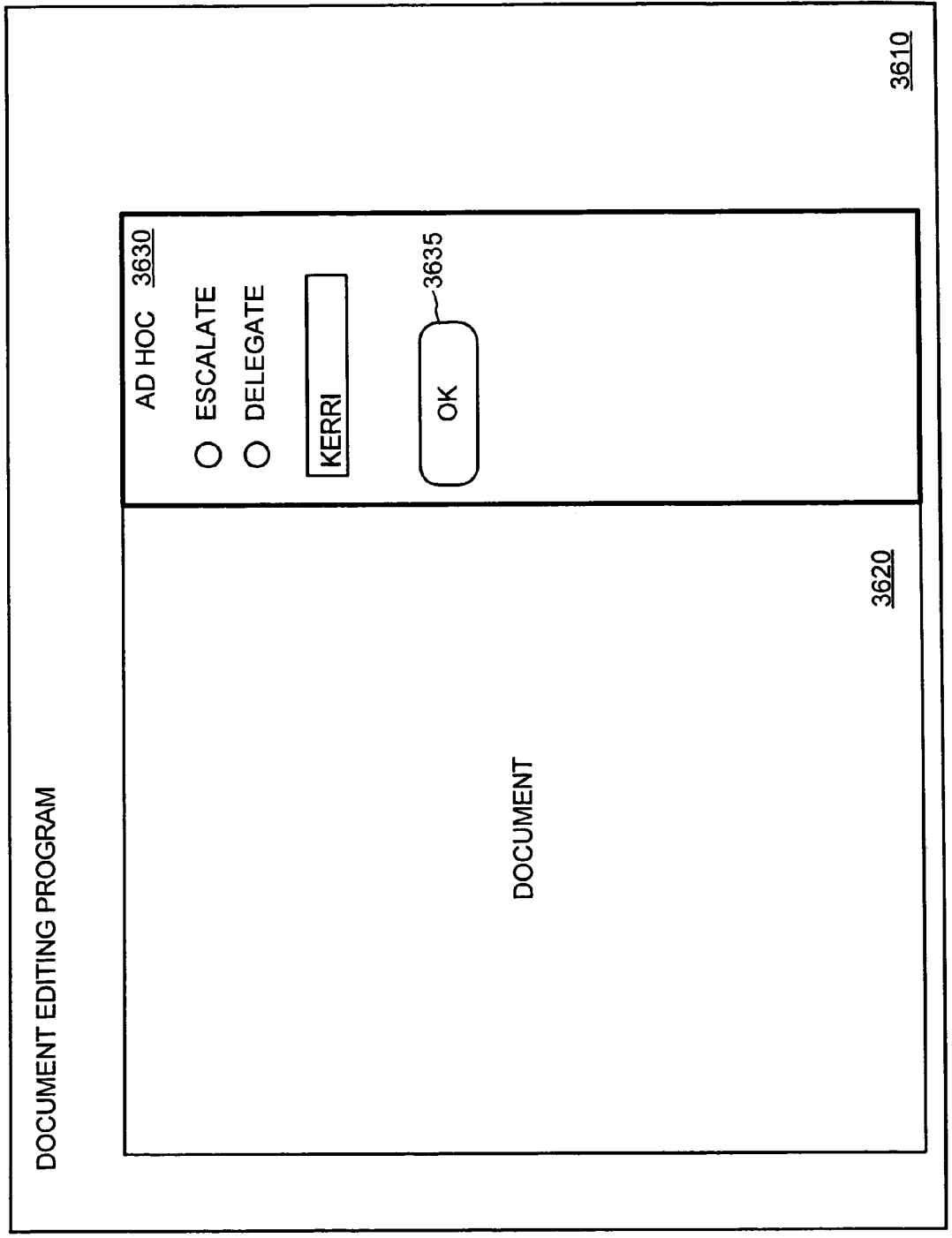
Figure 37:
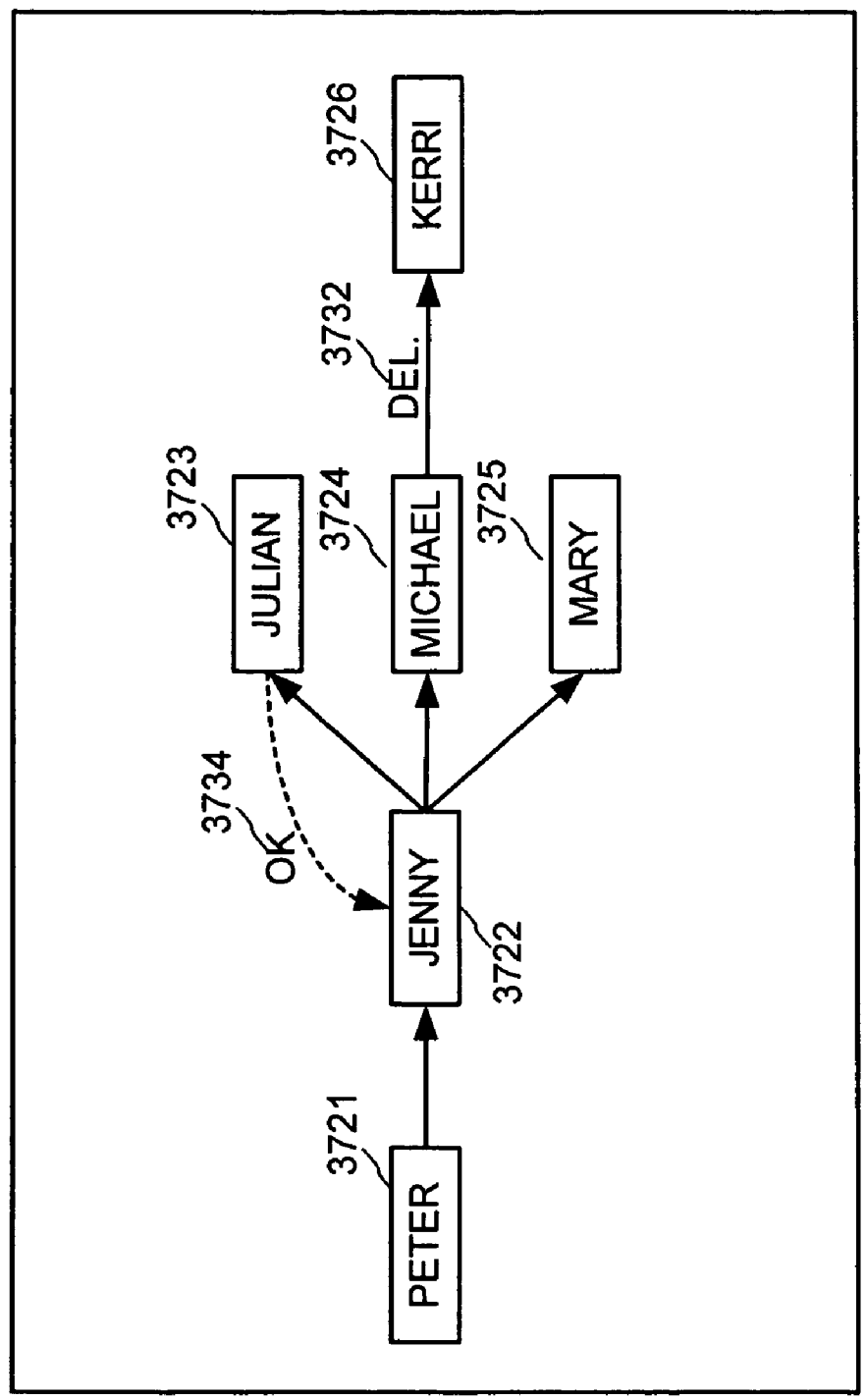

FIGS. 35–37 show exemplary screen shots. FIG. 35 shows an exemplary email program 3510 in which an email 3520 has been received by the account manager from the customer. Included in the email is the RFP document in the form of an email attachment 3530. In the example, the account manager can start an activity flow based on an activity model by forwarding the email 3520 to an email alias (e.g., "RFP Approval"). The email software can process the email based on email processing rules to start the activity flow based on the activity model, which generates appropriate tasks for the experts 3430A–3430D and can include the attachment 3530 (or a link to it) as part of the task.

FIG. 36 shows an exemplary user interface presented to one of the experts 3430A–3430D when the document associated with the task is opened. The user interface can be a familiar document editing (e.g., word processing) program 3610, which presents the document 3620 (e.g., based on the attachment 3530).

The user interface can also include a pane 3630 that allows one of the experts 3430A–3430D to escalate or delegate the task to another actor. In the example, the viewing actor delegates the task to actor "Kern" and activates the user interface element 3635.

Due to the tracking feature of the workflow technologies, a presentation 3700 can show the status of the workflow described above. The customer Peter 3721 initiated the workflow by sending an email. For example, instead of manually forwarding the email, the actor Jenny 3722 could have a rule set up in her email inbox to automatically start an activity model based on detecting "New RFP" in the subject of a message. The experts 3723-3725 have received the RFP for review. Julian 3723 has approved the RFP at 3734, and Michael 3724 has delegated 3732 his task to Kerry 3726, as indicated by the indicator 3732.

EXAMPLE 25

Exemplary Notification of Task

Figure 38:
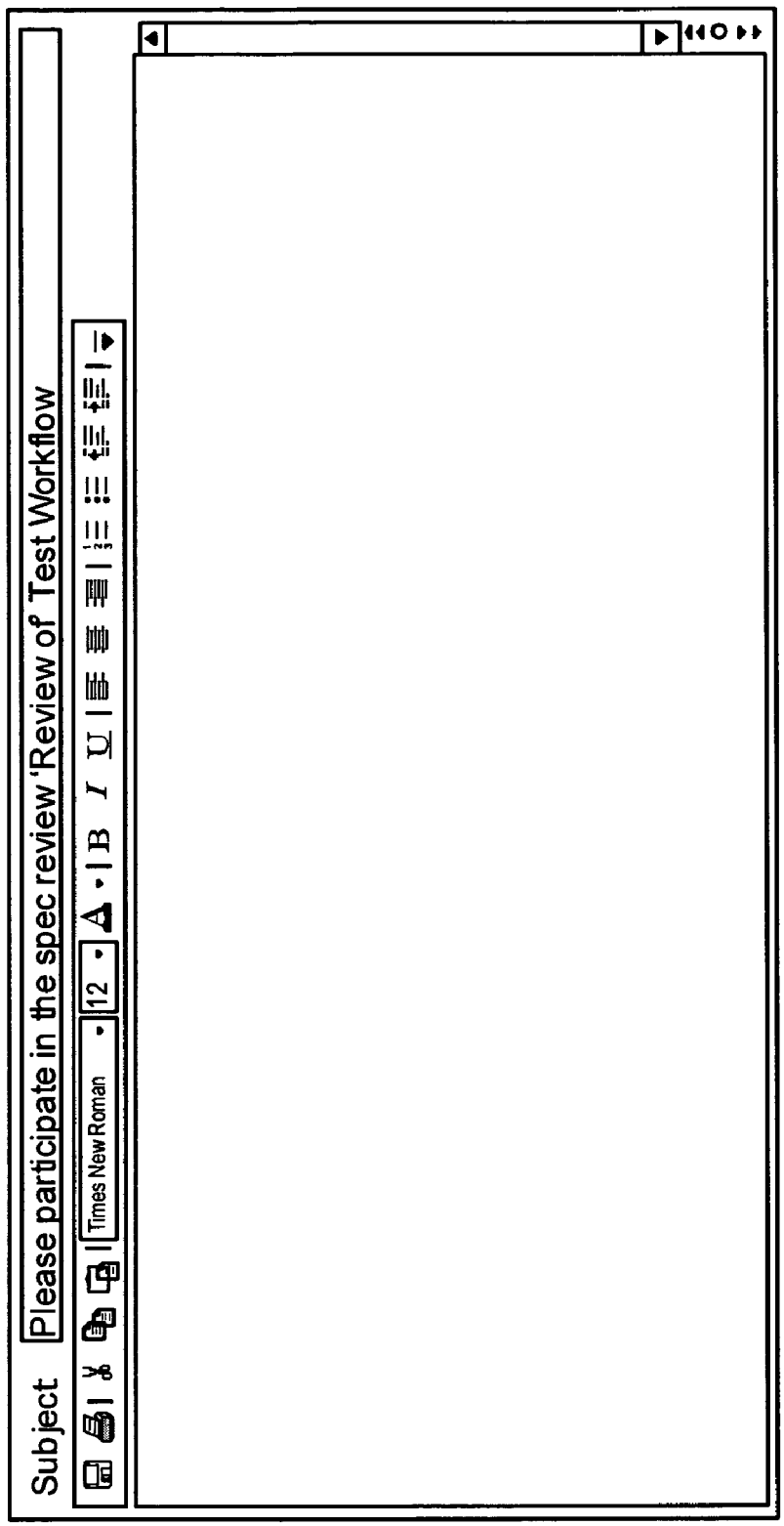
FIG. 38 shows an exemplary notification of a task with hyperlinks.

FIG. 38 shows a screen shot of an exemplary notification 3800 sent (e.g., via email) when a task is assigned to a recipient actor. The notification can give instructions on how to respond to the task. The notification can include a hyperlink to the document and a hyperlink to the task.

EXAMPLE 26

Exemplary Schemas for Message Types

Exemplary schemas for various message types are shown below. The message types can include activate, activate response, synchronize, task, finish, and interrupt. Although some of the examples indicate that a schema should not be modified for purposes of conforming to the schema, alternative implementations can use a different set of schemas accomplishing similar functionality. For example, although Globally Unique Identifiers (GUIDs) are specified in the examples, other identifiers (e.g., another unique identifier) can be used instead. In the examples, the workflow system is sometimes called a human workflow system ("HWS").

EXAMPLE 27

Exemplary Schema for Activate Message Type

The Hws_Activate message is an exemplary activate message used to supply parameters to an action during its activation. An action can have at most one activation message schema associated with it. In the example, the Hws_Activate message has three child elements under the HwsMessage node. These are HwsSection, ActionSection and Payloads. These are explained below:

HwsSection: The HwsSection holds definitions of XML elements and attributes that are reserved for use by the Hws system. Elements or attributes defined under this section should not be modified. Table 2 shows an exemplary list of elements/attributes defined under the HwsSection node.

TABLE 2

Exemplary Elements/Attributed under HwsSection node

| Node name | Node type | Data type | Min/Max occurance | Description |
|---|---|---|---|---|
| HwsMessageType | Attribute | String | 1/1 | This attribute identifies the message schema to be of type Hws_Activate. The default value for the attribute is "Hws_Activate". |
| ActivityFlowID † | Element | String | 1/1 | The value for this element is a GUID string and it identifies the activity flow which the action being instantiated is going to be a part of. |
| ActivityFlowDescription | Element | String | 1/1 | The value for this element should carry a description of the activity flow which the action being instantiated is going to be a part of. |
| InitiatingActor | Element | String | 1/1 | The value for this element is the id of the actor initiating the action. |
| ActionTypeID | Element | String | 1/1 | The value for this element is a GUID string that identifies the action being instantiated. |
| ActionInstanceID † | Element | String | 1/1 | The value for this element is a GUID string that uniquely identifies an instance of the action being activated. |
| ActionInstanceDescription | Element | String | 1/1 | The value for this element should carry a description for the action instance being activated. |
| ParentActionInstanceID † | Element | String | 1/1 | The value for this element is a GUID string that identifies the action instance preceding this action in the activity flow. |
| ParentTaskID | Element | String | 1/1 | The value for this element is a GUID string that identifies a task from a preceding action in the activity flow. This is the id of the task message that led or required the initiating actor to activate the current action. |
| ActivityModelTypeID | Element | String | 1/1 | The value for this element is a GUID string that identifies the activity model the action being instantiated is a part of. |
| ActivityModelInstanceID † | Element | String | 1/1 | The value for this element is a GUID string that identifies the activity model instance |

TABLE 2-continued

Exemplary Elements/Attributed under HwsSection node

| Node name | Node type | Data type | Min/Max occurance | Description |
|---|---|---|---|---|
| | | | | the action being activated is a part of. |
| ActivityModelStepID | Element | Int | 1/1 | The value for this element is a GUID string that identifies an activity model step associated with this action. Each step within an activity model is associated with one action. |
| IsDependentOnParent † | Element | Boolean | 1/1 | This flag determines if the action being instantiated should wait for a synchronize message from a parent action instance. If true, the current action waits for a synchronize message from the parent action before it proceeds. If false, the current action does not wait for the synchronize message. |
| ActivityFlowProperties | Record | | 1/1 | This node groups properties that correspond to an activity flow and need to be tracked so that they can be used in other actions in the activity flow. |
| ActivityFlowProperties\Property | Record | String | 0/unbounded | This property is optional. Nodes of this type carry values for properties that need to be tracked at the activity flow level. |
| ActivityFlowProperties\Property\Name | Attribute | String | 1/1 | Name of the property being tracked at activity flow level. |
| ActivityFlowProperties\Property\Description | Attribute | String | 1/1 | Description of the property being tracked at activity flow level. |
| ActivityFlowProperties\Property\Type | Attribute | String | 1/1 | Data type of the property being tracked at activity flow level. |
| ActionProperties | Record | | 1/1 | This node groups properties that correspond to an action instance and need to be tracked. |
| ActionProperties\Property | Record | String | 0\unbounded | This property is optional. Nodes of this type carry values for properties that need to be tracked at the action instance level. |
| ActionProperties\Property\Name | Attribute | String | 1/1 | Name of the property being tracked at action instance level |
| ActionProperties\Property\Description | Attribute | String | 1/1 | Description of the property being tracked at action instance level |
| ActionProperties\Property\Type | Attribute | String | 1/1 | Data type of the property being tracked at action instance level |
| HwsWebServiceUrl | Element | String | 1/1 | Url of the Human workflow web-service. |

† These properties are promoted out by default for reference and use in the action template.

ActionSection: The ActionSection is customizable by action developers and can contain any action specific parameters and values to be delivered to the action during instantiation. This section may contain elements that correspond to human targets for the action. The values of elements/attributes in the ActionSection are not tracked by the Hws interceptor. If you need properties that should be tracked, specify them in the instance document under the pre-defined HwsSection\ActionProperties collection.

Payloads: The payloads node in the schema is a placeholder for applications to specify additional information that may need to be included in other messages sent out by the action.

Annotations: The activation message schema carries annotations used by the Hws system. There are some properties that are defined at the schema root node level and some are defined at the element node level.

Schema node properties: The following properties are defined at schema node level:
  Description: The value in this property is used to describe the action the activation message is associated with.
  Incoming Sync messages: This property specifies the target namespace of the synchronize messages that are received by the orchestration associated with the activation message.
  Outgoing Sync messages: This property specifies the target namespace of the synchronize messages that are sent by the orchestration associated with the activation message.

Element node properties: For element nodes defined under the ActionSection element of the schema document Hws defines the following property:
  Target: This is a Boolean property. The value true indicates that the element node is a human target that is a recipient of one or more task messages sent by the action associated with the activation message. A false value or if a value is not specified, indicates that the node is not a human target.

Each activation message schema can have a target namespace that uniquely identifies it within the set of deployed schemas.

EXAMPLE 28

Exemplary Schema for Activate Response Message Type

The Hws_ActivateResponse message is an exemplary activate response message used internally by the action template to initialize a set of correlation variables that are used for receiving other messages in the template.

The Hws_ActivateResponse message has only one child element under the HwsMessage node. This is the HwsSection. This is explained below:

HwsSection: The HwsSection holds definitions of xml elements and attributes that are reserved for use by the Hws system. Elements or attributes defined under this section should not be modified. Table 3 shows an exemplary list of elements/attributes defined under the HwsSection node.

TABLE 3

Exemplary Elements/Attributed under HwsSection node

| Node name | Node type | Data type | Min/Max occurance | Description |
|---|---|---|---|---|
| HwsMessageType | Attribute | String | 1/1 | This attribute identifies the message schema to be of type Hws_ActivateResponse. The default value for the attribute is "Hws_ActivateResponse". |
| ActivityFlowID † | Element | String | 1/1 | The value for this element is a GUID string and it identifies the activity flow which the action is a part of. |
| ActionInstanceID † | Element | String | 1/1 | The value for this element is a GUID string that uniquely identifies an instance of the action activated. |
| ParentActionInstanceID † | Element | String | 1/1 | The value for this element is a GUID string that identifies the action instance preceding this action in the activity flow. |
| ActivityModelInstanceID † | Element | String | 1/1 | The value for this element is a GUID string that identifies the activity model instance the action being activated is a part of. |

† These properties are promoted out by default tor initializing the correlation sets used by the action template.

Annotations: The activate response message schema has annotation for Description of the message. The value for this annotation is not available for editing.

The TargetNamespace of this schema is defined via an URL (e.g., http://[base]/Hws_ActivateResponse). This schema can be compiled into an assembly (e.g., a DLL) and is referenced by the action template. The message is constructed in the action and sent/received over a direct-bound port.

EXAMPLE 29

Exemplary Schema for Synchronize Message Type

The Hws_Synchronize message is an exemplary synchronize message sent from one action to another to unblock the execution of the receiving action. The receiving action instance should have been activated with the IsDependentOnParent property in its activation message set to true to be able to wait for the synchronize message.

The Hws_Synchronize message has three child elements under the HwsMessage node. These are HwsSection, ActionSection and Payloads. These are explained below:

HwsSection: The HwsSection holds definitions of xml elements and attributes that are reserved for use by the Hws system. Elements or attributes defined under this section should not be modified. Table 4 shows an exemplary list of elements/attributes defined under the HwsSection node.

deployed schemas. If the TargetNamespace of the synchronize message is changed or if a new synchronize message schema is added to an action then the Incoming Sync Messages and Outgoing Sync Messages properties on the activation message (of the action that either sends this synchronize message or receives it) needs to be updated as well. Synchronize messages are sent and received over direct-bound ports.

TABLE 4

Exemplary Elements/Attributed under HwsSection node

| Node name | Node type | Data type | Min/Max occurance | Description |
|---|---|---|---|---|
| HwsMessageType | Attribute | String | 1/1 | This attribute identifies the message schema to be of type Hws_Synchronize. The default value for the attribute is "Hws_Synchronize". |
| ActivityFlowID | Element | String | 1/1 | The value for this element is a GUID string and it identifies the activity flow which the action sending the synchronize message is a part of. |
| ActionInstanceID † | Element | String | 1/1 | The value for this element is a GUID string that uniquely identifies the action instance that sends the synchronize message. |
| ActivityModelInstanceID | Element | String | 1/1 | The value for this element is a GUID string that identifies the activity model instance the action sending the synchronize message is a part of. |
| HwsWebServiceUrl | Element | String | 1/1 | Url of the Human workflow web-service. |

† These properties are promoted out by default for reference and use in the action template.

ActionSection: The ActionSection is customizable by action developers and can contain any scenario specific parameters and values to be delivered to the receiving action.

Payloads:
  Annotations: The synchronize message schema has an annotation for Description of the message. This property is defined at the schema root node level.
    Schema node properties: The following properties can be defined at the schema node level:
      Description: The value in this property is used to describe the synchronize message.

Each synchronize message schema should have a Target Namespace that uniquely identifies it within the set of

EXAMPLE 30

Exemplary Schema for Task Message Type

The Hws_Task message schema is an exemplary schema used for messages that are sent to the participating targets of an action. An action can send task messages of one or more types. It can also send one or more instances of a given task message type. The Hws_Task message can be used for submitting responses back to the action also.

The Hws_Task message has three child elements under the HwsMessage node. These are HwsSection, ActionSection and Payloads. These are explained below:

HwsSection: The HwsSection holds definitions of xml elements and attributes that are reserved for use by the Hws system. Elements or attributes defined under this section should not be modified. Table 5 shows an exemplary list of elements/attributes defined under the HwsSection node.

TABLE 5

Exemplary Elements/Attributed under HwsSection node

| Node name | Node type | Data type | Min/Max occurance | Description |
|---|---|---|---|---|
| HwsMessageType | Attribute | String | 1/1 | This attribute identifies the message schema to be of type Hws_Task. The default value for the attribute is "Hws_Task". |
| ActivityFlowID | Element | String | 1/1 | The value for this element is a GUID string and it identifies the activity flow which the action sending or receiving the task message is part of. |
| TaskID† | Element | String | 1/1 | The value for this element is a GUID string that uniquely identifies each task that is being assigned to an actor by the action. The same TaskID value should used in the task message that the actor sends back to the action in response. |
| TaskDescription | Element | String | 1/1 | The value for this element should carry a description of the task being assigned to and actor or that of the response from the actor. |
| ActionTypeID | Element | String | 1/1 | The value for this element is a GUID string that identifies the action sending or receiving the task message. |
| ActionInstanceID † | Element | String | 1/1 | The value for this element is a GUID string that uniquely identifies an instance of the action sending or receiving the task message. |
| InitiatingActor | Element | String | 1/1 | The value for this element is the id of the actor who initiated the action that is sending or receiving the task message. |
| ActorElementXPath | Element | String | 1/1 | This is the Xpath of the target actor to which the task message is being sent. The XPath is the value of the Instance XPath property for the target node that corresponds to the target actor from the activation message of the action. |
| TargetActor | Element | String | 1/1 | The value of this element is the id of the actor who is receiving the task message or is sending the response for it. |
| ActivityModelTypeID | Element | String | 1/1 | The value for this element is a GUID string that identifies the activity model the action being instantiated is a part of. |
| ActivityModelStepID | Element | Int | 1/1 | The value for this element is an integer that identifies an activity model step associated with this action. Each step within an activity model is unique and is associated with one action. |

TABLE 5-continued

Exemplary Elements/Attributed under HwsSection node

| Node name | Node type | Data type | Min/Max occurance | Description |
|---|---|---|---|---|
| ActivityModelInstanceID | Element | String | 1/1 | The value for this element is a GUID string that identifies the activity model instance the action sending or receiving the task message is a part of. |
| TaskProperties | Record | | 1/1 | This node groups properties that correspond to a task and need to be tracked. |
| TaskProperties\Property | Record | String | 0/unbounded | This property is optional. Nodes of this type carry values for properties that need to be tracked at the task message level. |
| TaskProperties\Property\Name | Attribute | String | 1/1 | Name of the property being tracked at the task message level. |
| TaskProperties\Property\Description | Attribute | String | 1/1 | Description of the property being tracked at the task message level. |
| TaskProperties\Property\Type | Attribute | String | 1/1 | Data type of the property being tracked at the task message level. |
| HwsWebServiceUrl | Element | String | 1/1 | Url of the Human workflow web-service. |

ActionSection: The ActionSection is customizable by action developers and can contain any scenario specific parameters and values to be delivered to the participating targets. It can also be used to define any parameters that the targets can supply in their responses.

Payloads: The payloads node in the schema is a placeholder for applications to specify additional information that may need to be included in other messages sent out by the action.

Annotations: The task message schema carries annotations used by the Hws system. These properties are defined at the schema root node level.

Schema node properties: The following properties can be defined a the schema node level:

Description: The value in this property is used to describe the task message schema.

Target XPath: This property specifies the XPaths of the target nodes in the activation message to whom this task message goes.

Each task message schema should have a Target Namespace that uniquely identifies it within the set of deployed schemas.

EXAMPLE 31

Exemplary Schema for Finish Message Type

The Hws_Finish message is an exemplary finish message used internally by an action and is sent out when the action completes execution. The Hws_Finish message has only one child element under the HwsMessage node. This is the HwsSection. This is explained below:

HwsSection: The HwsSection holds definitions of xml elements and attributes that are reserved for use by the Hws system. Elements or attributes defined under this section should not be modified. Table 6 shows an exemplary list of elements/attributes defined under the HwsSection node.

TABLE 6

Exemplary Elements/Attributed under HwsSection node

| Node name | Node type | Data type | Min/Max occurance | Description |
|---|---|---|---|---|
| HwsMessageType | Attribute | String | 1/1 | This attribute identifies the message schema to be of type Hws_Finish. The default value for the attribute is "Hws_Finish". |
| ActionInstanceID † | Element | String | 1/1 | The value for this element is a GUID string that uniquely identifies an instance of the action that was activated and is now sending the finish message. |

Annotations: The activate response message schema has annotation for Description of the message. The value for this annotation is not available for editing.

The TargetNamespace of this schema can be defined via an URL (e.g., http://[base]/Hws_Finish). This schema can be compiled into an assembly (e.g., a DLL) and is referenced by the action template. The message is constructed in the action and sent/received over a direct-bound port.

EXAMPLE 32

Exemplary Schema for Interrupt Message Type

The Hws_Interrupt message is an exemplary interrupt message used to interrupt a running instance of an action. An interrupt message can be sent to an individual action instance, to an entire activity flow or to an entire activity model instance. There are two kinds of interrupts—abort and rollback.

The Hws_Interrupt message has only one child element under the HwsMessage node. This is the HwsSection. This is explained below:

HwsSection: The HwsSection holds definitions of xml elements and attributes that are reserved for use by the Hws system. Elements or attributes defined under this section should not be modified. Table 7 shows an exemplary list of elements/attributes defined under the HwsSection node compiled into an assembly (e.g., a DLL) and is referenced by the action template. An instance of the interrupt message is received over the ActionInterruptPort in the template. An interrupt message at activity flow level or activity model instance level is submitted to each action currently active in the activity flow or the activity model instance. An interrupt type Abort causes the interrupted action to terminate without compensating for the work done by the action. A Rollback interrupt type causes the action to compensate for the work already completed by the action.

EXAMPLE 33

Exemplary Implementation of Architecture

Figure 39:
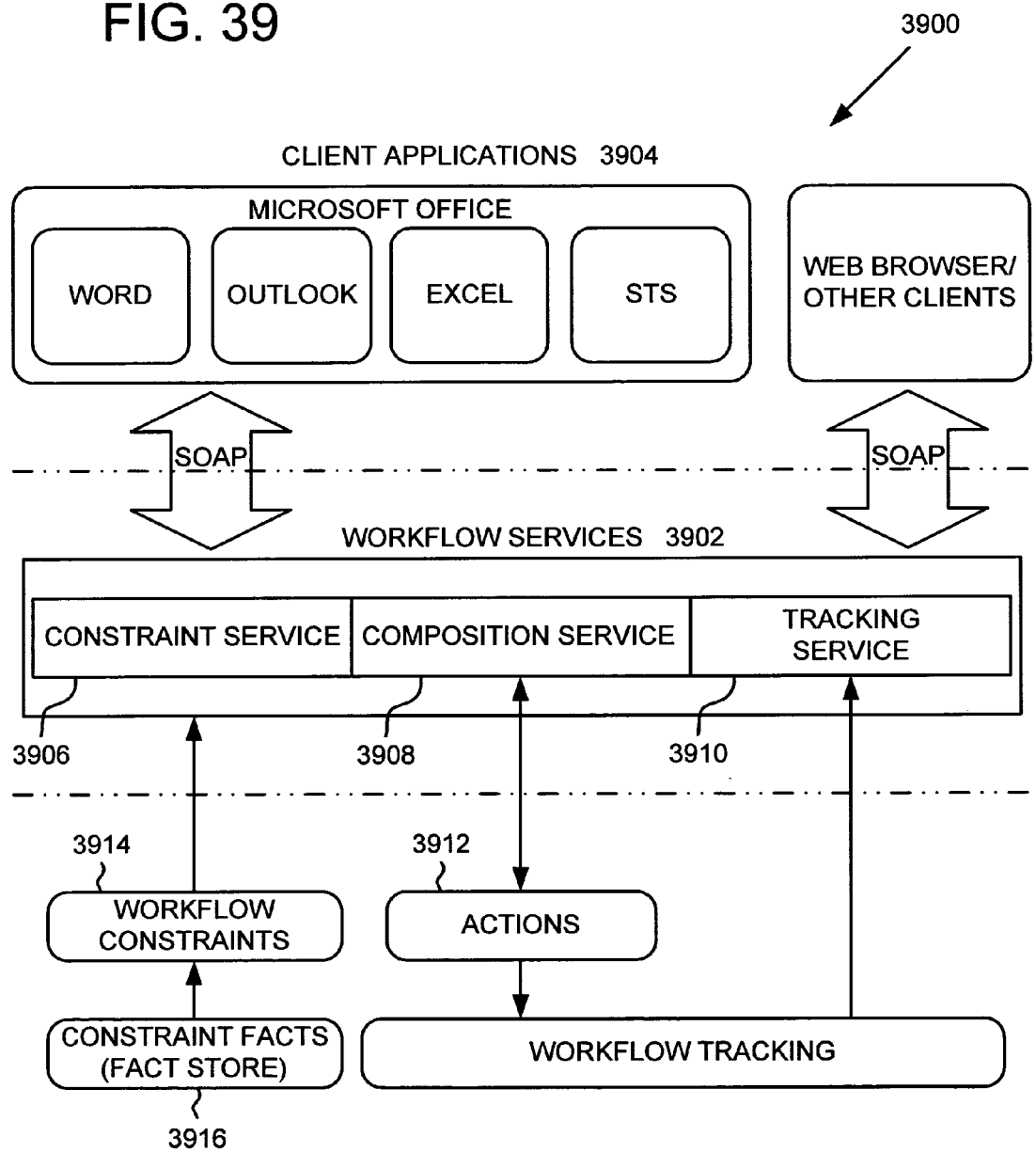
FIG. 39 is a block diagram showing an exemplary architecture for implementing a workflow system.

FIG. 39 shows an exemplary implementation of an architecture for a system 3900 including the workflow services 3902. In the example, the client applications 3904 can

TABLE 7

Exemplary Elements/Attributed under HwsSection node

| Node name | Node type | Data type | Min/Max occurance | Description |
| --- | --- | --- | --- | --- |
| HwsMessageType | Attribute | String | 1/1 | This attribute identifies the message schema to be of type Hws_Interrupt. The default value for the attribute is "Hws_interrupt". |
| InterruptLevel | Record | N/A | 1/1 | Holds one of the three interrupt level elements defined in the Choice group. |
| InterruptLevel/<Choice> | Choice Group | N/A | 1/1 | Choice group that holds values for one of ActionInstanceID, ActivityFlowID or ActivityModelInstanceID. |
| InterruptLevel/Choice/ActionInstanceID † | Element | String | 1/1 | The value for this element is a GUID string that uniquely identifies an instance of the action being interrupted. |
| InterruptLevel/Choice/ActivityFlowID † | Element | String | 1/1 | The value for this element is a GUID string and it identifies the activity flow which is being interrupted. |
| InterruptLevel/Choice/ActivityModelInstanceID † | Element | String | 1/1 | The value for this element is a GUID string that identifies the activity model instance which is being interrupted. |
| RequestingActor | Element | String | 1/1 | The value for this element is the id of the actor requesting the interrupt. |
| InterruptType | Element, Restricted | String | 1/1 | The value for this element is restricted to either Abort or Rollback. |
| HwsWebServiceUrl | Element | String | 1/1 | Url of the Human workflow web-service. |

Annotations: The interrupt message schema has annotation for Description of the message. The value for this annotation is not available for editing.

The TargetNamespace of this schema can be defined via an URL (e.g., http://[base]/Hws_Finish). This schema can be leverage workflow services 3902 to enable actors to create and participate in workflow. Workflow services 3902 can provide three major services to client applications: workflow composition 3908, workflow constraints 3906 and workflow tracking and viewing 3910.

Workflows can be created by composing actions 3912 within an activity flow. The composition of actions 3912 is governed by constraints 3914 that are enforced by workflow services 3902. Constraints 3914 can be defined in any number of known methods, including through a workflow administration and management (e.g., Multi-Media Commands (MMC)) or through an administrative Application Programming Interface (API) in a programmatic manner.

The definition of these constraints 3914 can leverage facts exposed by fact retrievers. Fact retrievers can implement a standard interface so that the constraint service 3906 can query these facts and apply them to the workflow. A fact retriever may expose facts from any underlying data source 3916, such as an Active Directory or Structured Query Language (SQL) database.

Client applications 3904 can register with workflow services 3902 when they want to participate in an activity flow. The composition service 3908 can associate a unique ID with the client request and use this ID to keep track of actions 3912 that an actor performs as part of an activity flow.

The tracking service 3910 can be used to keep track of the state of the activity flow and to reconstruct the activity flow as requested by a client. When a client makes an attempt to attach an action 3912 to the activity flow, the constraint service 3906 can check constraints (e.g., based on the Fact Store 3916 or the state of a flow) to see which actions 3912 can be attached in the activity flow. For example, displayed options can be limited to those available under the constraints. After the user selects an action from the constrained set, the composition service 3908 can compose the selected actions with those already in use.

The Actions can be instrumented to emit tracking events that are consumed by the tracking service 3910. These events can then be accessed by the client to provide an up-to-date workflow to actor.

EXAMPLE 34

Exemplary Implementation of User Interface for Accessing Workflow Services

Figure 40:
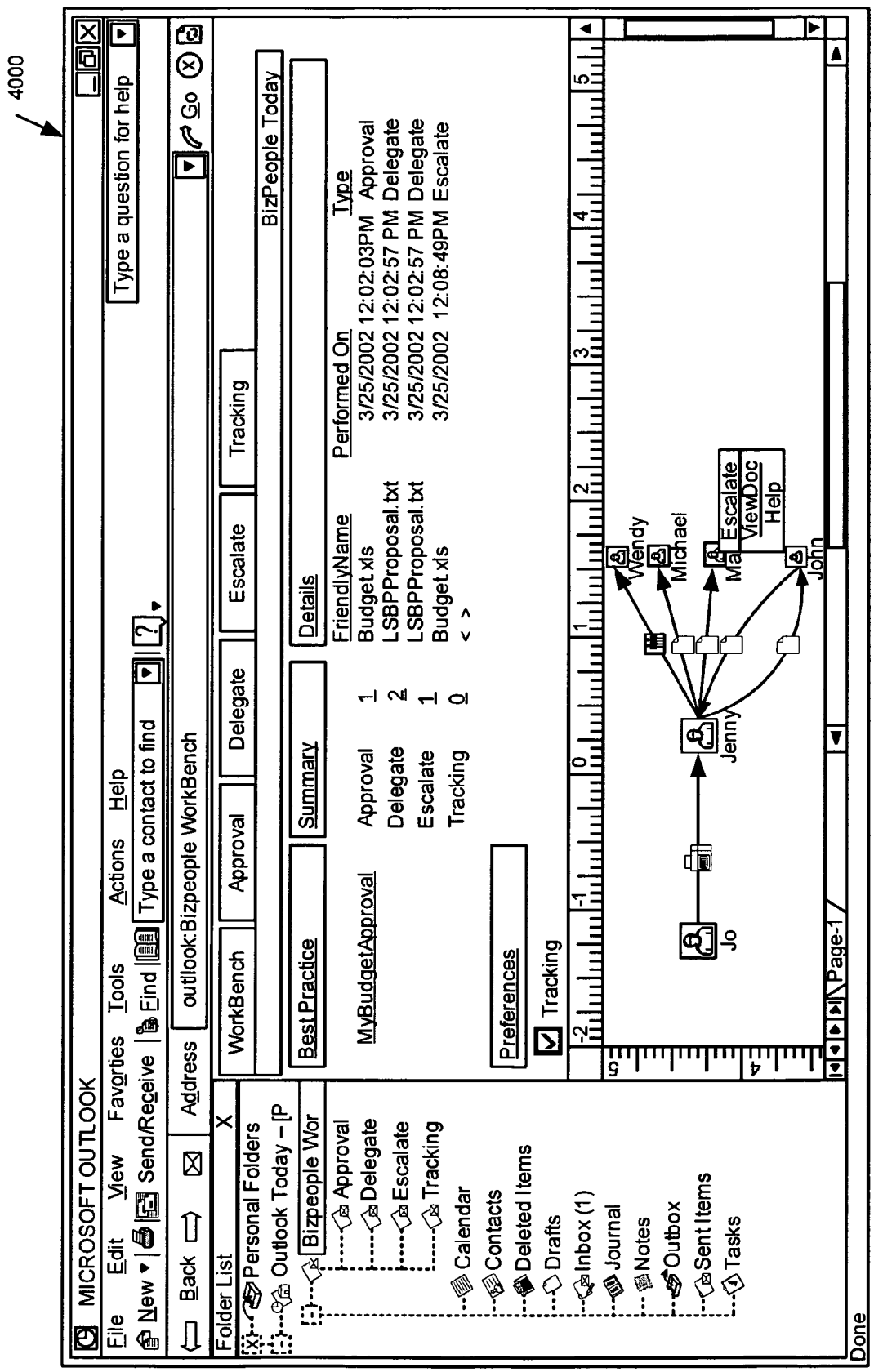
FIG. 40 is a screen shot showing an exemplary implementation of a user interface for showing the status of a workflow and accepting selection of next actions.

FIG. 40 shows an exemplary implementation of a user interface 4000 for accessing workflow services. In the example, a graphical depiction of an activity flow is shown, and a user is presented with an option to escalate a task (e.g., by right clicking on the actor).

EXAMPLE 35

Exemplary Implementation of Template for Building Actions

Figure 41:
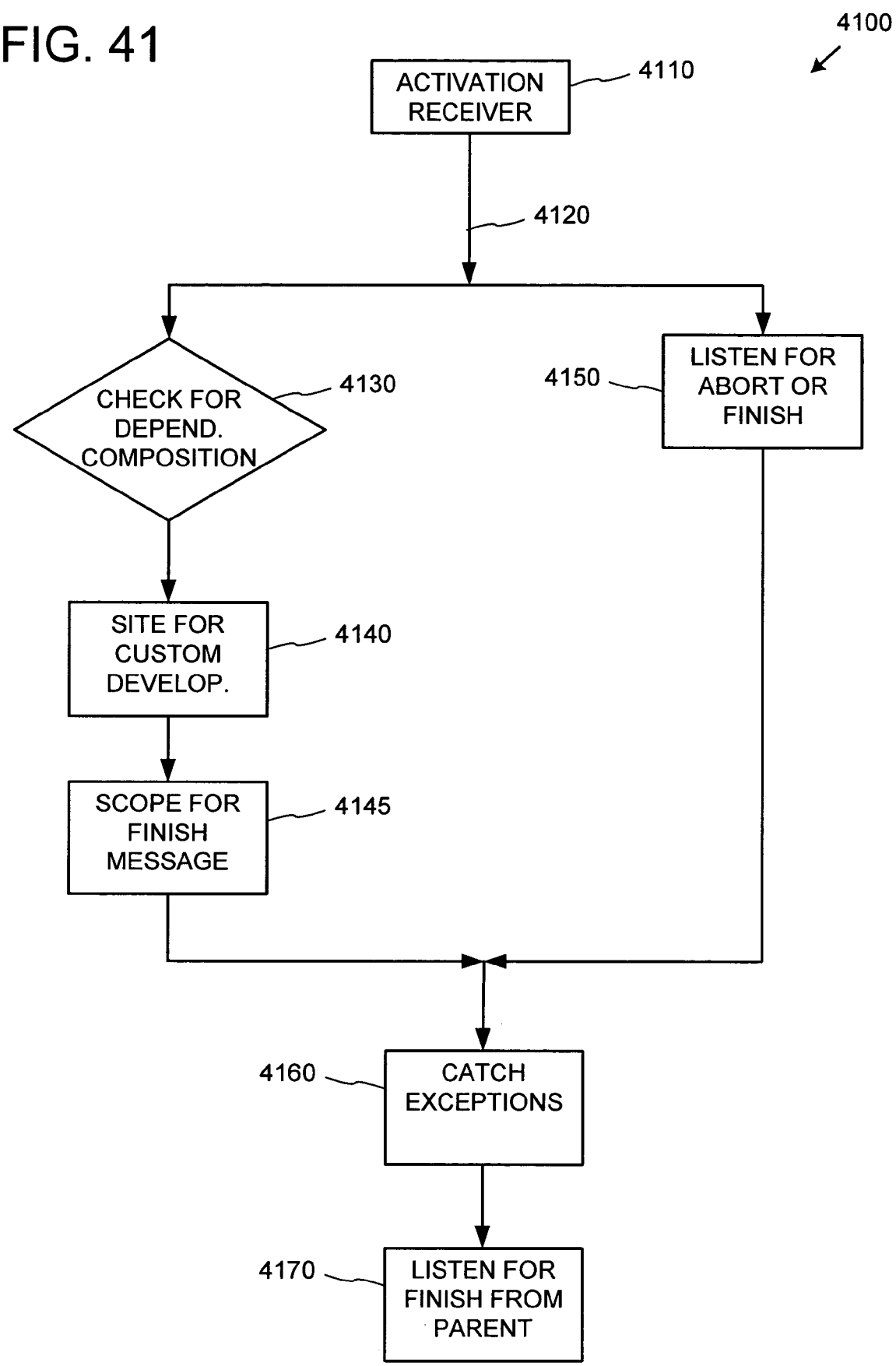
FIG. 41 is a screen shot showing an exemplary template for a composable action.

FIG. 41 shows an exemplary template 4100 for building actions. In the example, the template 4100 is presented in a visual programming environment, but it can be represented in other ways. The template 4100 can handle a wide variety of scenarios so that developers need only drop in the logic for the particular scenario. For example, dependent composition can be supported by the template.

The template 4100 can include activation receiver logic 4110. The action can receive the activate message over a one-way port that is bound to the Hyper Text Transport Protocol (HTTP) transport. It can then create an instance of the ActivateResponse message. The response message is used to initialize correlation sets used later in orchestration. The action sends the message to itself. It can use the SendOrReceiveActivateResponse operation of the ActionDirectBoundOutPort to send the message out and receives it back using the ActionDirectBoundInPort. The section 4110 of the template can also check to see if the value for ParentActionInstanceID or ActivityModelInstanceID are empty identifiers (e.g., empty GUIDs). If so, it can generate new identifier values for the properties. The values will be empty identifiers if the action being instantiated does not have a parent action or if the action is not being instantiated as part of an activity model. If there are many such action instances, an equal number of non-unique subscriptions for finish and interrupt message types can be created, which could adversely affect performance.

Such a situation is avoided by generating new identifiers and is safe because the subscriptions are not expected to be fulfilled in such scenarios anyway. Uniqueness of subscription guarantees that the routing performance of the messages for valid subscribers does not degrade.

The parallel statement 4120 has two branches. The left branch allows for composition of the action to another (e.g., 4130) and also provides the site for custom development within the template (e.g., 4140). The right branch allows the action to listen for interrupt and finish messages (e.g., 4150).

Figure 42:
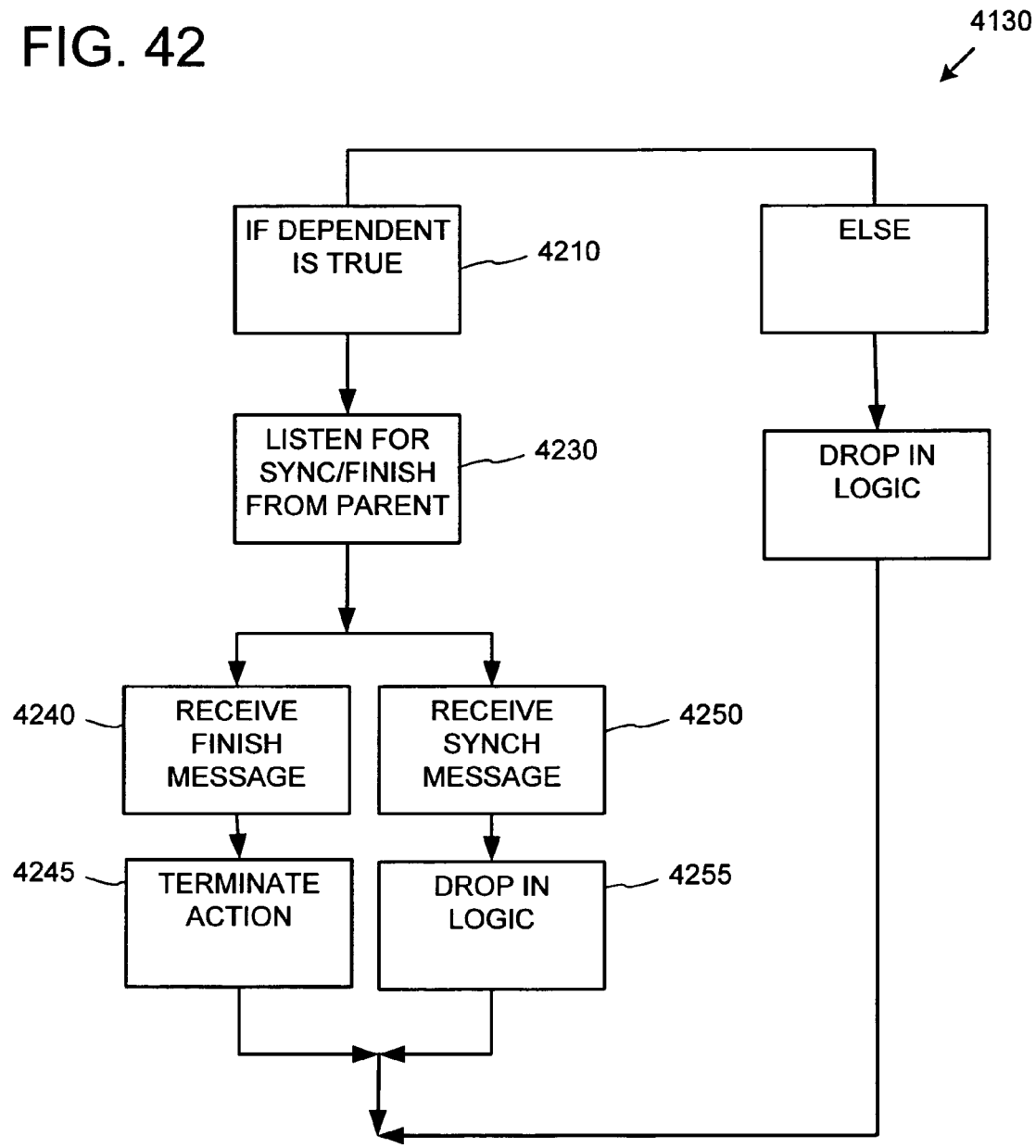
FIG. 42 is a screen shot showing a portion of an exemplary template for a composable action.

The decision shape 4130 (blown up as FIG. 42) checks to see if the action was activated with the intention of composing it as dependent on another action. At 4210 it checks for the IsDependentOnParent promoted property in the activation message. If so, the action waits for receipt of a synchronize message or a finish message from the parent at 4230.

The receive shapes for synchronize message 4250 or finish message 4240 use correlation sets based on the instance id of the parent action. Upon receipt of the synchronize message, the execution proceeds to ScopeAllActionSpecificLogic and can execute logic dropped in by the developer at 4255.

A receipt of a finish message instead, causes the action to terminate at 4245. In such a case, before terminating, the action sends out a finish message to the message-box over a direct bound port to indicate its completion.

The correlation set used on the synchronize message can be extended to include additional properties promoted out of the activate message. Additional correlation sets can be used as well on the receive shape for the synchronize message 4250.

The listen for a finish message in parallel with the synchronize message allows dependent actions to clean up if the parent action ends without sending a synchronize message.

Custom logic (e.g., business logic) can be incorporated into the site for custom development 4240. There is a transactional scope and a compensation block defined around the site 4240. This allows custom compensation to be built if the action is sent an interrupt message requesting a rollback operation or if an unknown exception is raised within the action.

4250 listens for an instance of an interrupt message based of multiple subscriptions. It also listens for a finish message from itself. The action subscribes for interrupt messages at three levels of granularity: action instance level, activity flow level, and activity model level. An interrupt message may request an abort or a rollback of the action's operations. Receipt of the interrupt message causes an exception of Abort or Rollback to be raised within the action. These exceptions are caught within the template (e.g., at 4260) and the exception handler calls compensate for the ScopeAllActionSpecificLogic scope at 4240.

The other message in the listen block 4250 is the finish message from itself. This message is generated by the action itself and is sent to the message box via a direct-bound port in the left hand side branch of the parallel statement 4220. The message is sent right after the ScopeAllActionSpecificLogic scope (e.g., at 4240) completes. A receipt of this message in the right hand side branch causes the listen shape ListenForAbortOrFinish to complete and the branch to end.

The section 4260 of the action has exception handlers for the Abort, Rollback, and Unknown exceptions. The Abort and Rollback exceptions are generated within the action upon receipt of the interrupt message. The exception handler for the Abort exception builds and then sends out the finish message indicating that the action is completing and then enters the terminate state. The exception handler for the Rollback exception calls the compensation block CompensateForAllActionSpecificLogic before building and sending a finish message. It then enters the terminate state.

The exception handler for the Unknown exception also calls the compensation block CompensateForAllActionSpecificLogic before building and sending a finish message and terminating.

Each exception handler can send out a finish message to the message box over a direct bound port. This message indicates to other child actions that were dependently composed to this action and have not received a synchronize message to terminate. The finish message is received by the dependently composed child actions (e.g., at 4230)

4270 listens for a finish message from a parent action. It times out (e.g., after 5 seconds) if a message is not received; then the action completes. This is done so that the action consumes a finish message from a parent action that was routed to it but not consumed. This condition arises if the parent action sends a synchronize message and also sends a finish message in quick succession. Only the synchronize message is consumed by the dependent child action in the listen shape (e.g., 4230). The finish message is delivered to the child action, but it is not consumed because the listen shape accepts only the first of the two messages. If the child action completes without consuming this message and the pattern continues for other instances as well, a number of orphaned message entries can build up in the message box database, adversely affecting performance. Having a listen shape 4270 avoids the action completing without consuming the finish message if it was already routed to it.

EXAMPLE 36

Combinations of the Technologies

Technologies from any example described herein can be combined with technologies in any combination of one or more other examples described herein.

EXAMPLE 37

Exemplary Computer System

Any of the exemplary systems described herein can be implemented by software running on a computer system, such as a general purpose programmable computer, including microprocessor-based systems running any of a variety of operating systems, including the Microsoft® Windows® operating system and others. Such computer systems can include or work in conjunction with computer-readable media, such as Random Access Memory (RAM), Read-Only Memory (ROM), hard disks, Compact Disc Read-Only Memory (CD-ROM), Digital Video Disc Read-Only Memory (DVD-ROM), and the like.

EXAMPLE 38

Exemplary Computer-Executable Instructions

Any of the exemplary methods described herein can be implemented by software comprising computer-executable instructions, which can be stored in computer-readable media.

Alternatives

In view of the many possible embodiments to which the principles of the invention may be applied, it should be recognized that the illustrated embodiments are examples of the invention, and should not be taken as a limitation on the scope of the invention. Rather, the scope of the invention includes what is covered by the following claims. We therefore claim as our invention all that comes within the scope and spirit of these claims.

We claim:

1. An automated workflow service system comprising:
an activity flow composition service operable to communicate with a client via a SOAP-based protocol and instantiate a plurality of instantiated actions in response to requests from the client, the activity flow composition service further operable to add an instance of an action to an activity flow at execution time of the activity flow responsive to communication from the client;
a fact store comprising a plurality of facts extracted from a plurality of knowledge bases via knowledge base adapters having respective schemas for the knowledge bases;
a constraint service operable to communicate with the client via the SOAP-based protocol and operable to enforce constraints based on an identity of a participant actor of the activity flow, the constraint service further operable to enforce constraints based on facts in the fact store; and
a tracking service operable to track messages to and from the instantiated actions.

* * * * *